US012741831B2

(12) United States Patent

Perano et al.

(10) Patent No.: US 12,741,831 B2
(45) Date of Patent: *Sep. 22, 2026

(54) REFRIGERATED PHARMACEUTICAL ORDER PROCESSING SYSTEMS

(71) Applicant: Express Scripts Strategic Development, Inc., St. Louis, MO (US)

(72) Inventors: Kenneth Perano, Saint Charles, MO (US); Scott Swindells, Chesterfield, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/082,729

(22) Filed: Mar. 18, 2025

(65) Prior Publication Data

US 2025/0263252 A1 Aug. 21, 2025

Related U.S. Application Data

(63) Continuation of application No. 18/442,259, filed on Feb. 15, 2024, now Pat. No. 12,338,084.

(51) Int. Cl.
*B65G 59/06* (2006.01)

(52) U.S. Cl.
CPC ......... *B65G 59/066* (2013.01); *B65G 59/063* (2013.01)

(58) Field of Classification Search
CPC .. B65G 59/067; B65G 59/068; B65G 59/062; B65G 59/066; B65G 59/06; B65G 47/06; B65G 1/0471; B65G 47/82; B65G 47/24; B65G 47/261; B65G 61/00; B65G 2203/0233; B65G 1/1376; B65G 47/91; B65G 43/08; B65G 1/1373; B65B 35/40
USPC ................................ 414/797.4, 797.6, 797.9
See application file for complete search history.

(56) References Cited

U.S. PATENT DOCUMENTS

| | | | | | |
|---|---|---|---|---|---|
| 3,333,666 | A | * | 8/1967 | Murray | G07F 17/0078 198/370.1 |
| 3,386,550 | A | * | 6/1968 | Murray | G07F 17/0078 99/335 |
| 3,688,518 | A | * | 9/1972 | Goltsos | A23B 2/8033 62/380 |
| 3,831,293 | A | * | 8/1974 | Ingram | B65G 57/005 34/236 |
| 4,419,384 | A | * | 12/1983 | Kane | G01B 17/00 427/427.2 |

(Continued)

FOREIGN PATENT DOCUMENTS

| | | | | | |
|---|---|---|---|---|---|
| KR | 20200072975 | A | * | 6/2020 | B65G 59/062 |
| RU | 2740120 | C1 | * | 1/2021 | A21B 7/00 |

*Primary Examiner* — Gregory W Adams
(74) *Attorney, Agent, or Firm* — Stinson LLP

(57) ABSTRACT

A container repository for containers includes a cabinet having an interior. A container holder is disposed in the interior of the cabinet. The container holder includes a container receiver and a container dispenser. The container receiver has a container interior sized and shaped to receive and hold the containers as a stack of containers. The container dispenser is arranged to remove a bottom-most container of the stack of containers from the stack of containers. A container transporter is at least partially disposed in the interior of the cabinet. The container transporter transports the containers after the containers are removed from the stack of containers.

18 Claims, 21 Drawing Sheets

(56) References Cited

U.S. PATENT DOCUMENTS

| | | | | | |
|---|---|---|---|---|---|
| 5,520,013 | A * | 5/1996 | Kuo | A23B 2/8033<br>62/380 |
| 6,484,066 | B1 * | 11/2002 | Riess | G01B 11/00<br>700/218 |
| 6,713,741 | B2 * | 3/2004 | Miller | A21B 1/48<br>219/699 |
| 9,053,379 | B2 * | 6/2015 | Olmstead | G06K 7/10861 |
| 9,334,126 | B2 * | 5/2016 | Bürgel | B65G 47/71 |
| 9,944,419 | B2 * | 4/2018 | Joplin | B65B 35/54 |
| 10,127,758 | B2 * | 11/2018 | Chirnomas | G06Q 10/08 |
| 11,001,453 | B2 * | 5/2021 | Hironaka | B65G 47/8815 |
| 11,161,696 | B2 * | 11/2021 | Sebastian | B65G 47/883 |
| 2021/0160973 | A1 * | 5/2021 | Deaton | H05B 6/782 |

* cited by examiner

REFRIGERATED PHARMACEUTICAL ORDER PROCESSING SYSTEMS

CROSS REFERENCE TO RELATED APPLICATIONS

This application is a continuation of U.S. application Ser. No. 18/442,259, which was filed Feb. 15, 2024. The entire disclosure of said application is incorporated herein by reference.

FIELD

The present disclosure generally relates to pharmaceutical order processing systems, and more particularly to pharmaceutical container processing systems for processing pharmaceutical containers stored in a refrigerated state.

BACKGROUND

High volume pharmacies process and fulfill a large number of prescription orders per day. These pharmacies often rely on automated systems to process, fill, and pack one or more prescriptions together for delivery to a patient. These automated systems generally fit into one of two categories: (1) systems, such as high-volume fillers, that automatically fill pharmaceutical containers (e.g., auto-filled containers) with specific quantities of pharmaceuticals; and (2) systems, such as unit-of-use systems, that process unit-of-use products or containers. A unit-of-use container contains an entire prescription of a pharmaceutical and can therefore be sent to the patient without modifying the pharmaceutical(s) (e.g., the quantity, type, etc.) in the container and without product packaging modification (or with minimal product packaging modification) except for labeling with patient information. Unit-of-use products can include a full course of medicine to be taken by a patient, for example, an entire prescription (e.g., a thirty-day supply, a sixty-day supply, or a ninety-day supply). The unit-of-use products contain known quantities of medication in packages that are closed and sealed by, for example, the pharmaceutical manufacturer.

SUMMARY

In one aspect, a container repository for containers comprises a cabinet having an interior. A container holder is disposed in the interior of the cabinet. The container holder includes a container receiver and a container dispenser. The container receiver has a container interior sized and shaped to receive and hold the containers as a stack of containers. The container dispenser is arranged to remove a bottommost container of the stack of containers from the stack of containers. A container transporter is at least partially disposed in the interior of the cabinet. The container transporter is configured to transport the containers after the containers are removed from the stack of containers.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
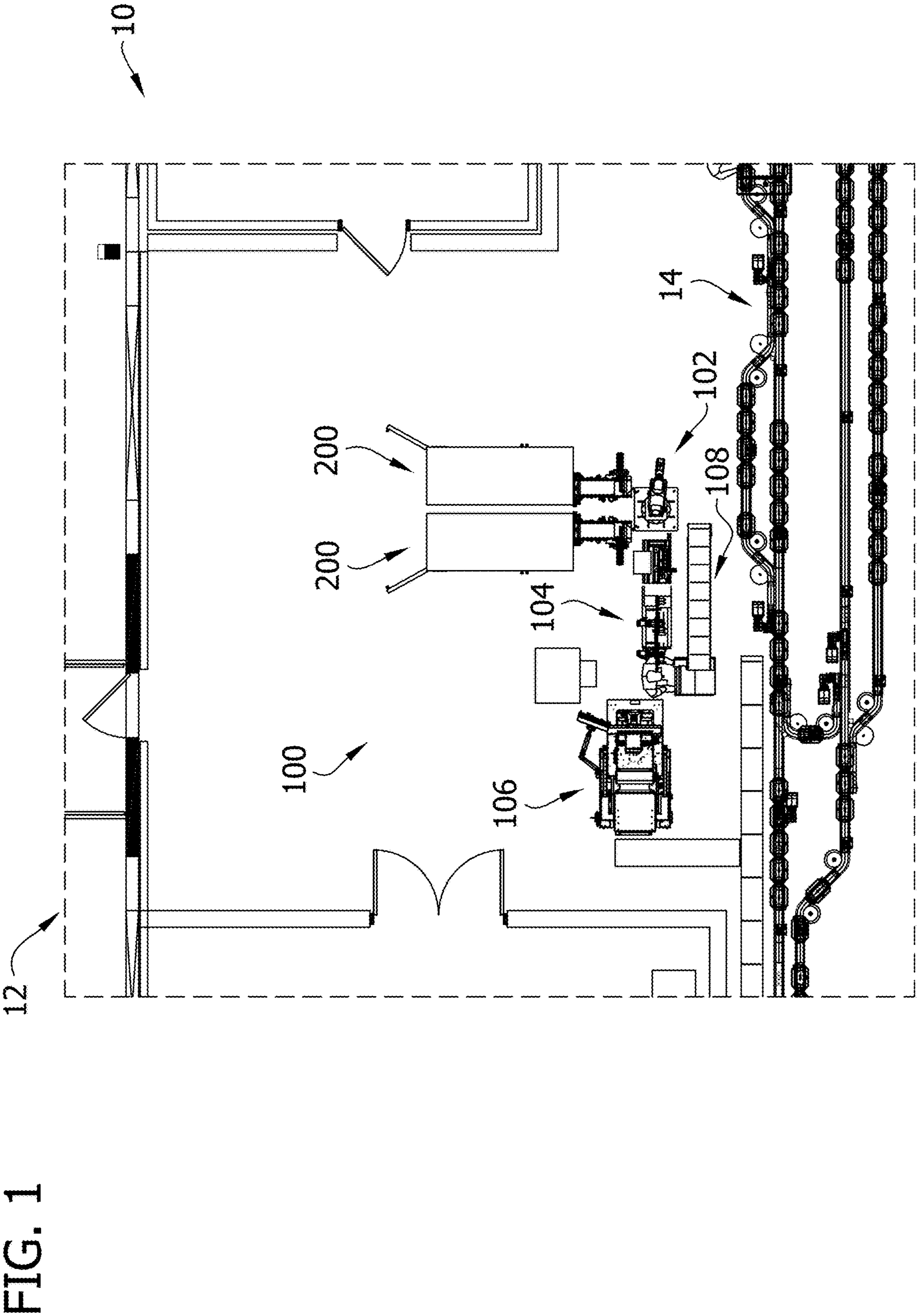
FIG. 1 is a plan view of a pharmaceutical order processing system according to one embodiment of the present disclosure.

Referring to FIG. 1, a pharmaceutical order processing system according to one embodiment of the present disclosure is indicated generally by reference numeral 10. The pharmaceutical order processing system 10 is contained within a pharmacy 12 (e.g., a generally automated pharmacy). The pharmaceutical order processing system 10 processes prescription orders received by the system. A prescription order may include one or more pharmaceuticals (e.g., prescription drugs, over the counter medication, medical tests, or other medical articles), which are contained in pharmaceutical containers C. The pharmaceutical containers C may be in the form of a bottle, a box, a package, a cylinder, flat sided container, or any other suitable container. In this embodiment, the pharmaceutical order processing system 10 is a mix system comprising both unit-of-use container systems that process pharmaceutical containers C that are generally unit-of-use products and high-volume pharmaceutical order processing system (e.g., a high-volume filler) that fills empty pharmaceutical containers C with specific quantities of pharmaceuticals. In the illustrated embodiment, the pharmaceutical order processing system 10 includes a pharmaceutical container processing system 100 (described in more detail below) for processing unit-of-use products, a high-volume filler (not shown), and corresponding conveyors 14 (e.g., conveyor belts or tracks) for conveying or moving items (e.g., pharmaceutical containers, packages, bins) about the pharmaceutical order processing system. For example, the conveyors 14 can transport bins carrying pharmaceutical containers C processed (e.g., filled) by the high-volume filler to the pharmaceutical container processing system 100 to receive or marry up with pharmaceutical containers processed by the pharmaceutical container processing system that are part of the same prescription order, before being shipped to the patient. Further details on pharmaceutical order processing systems and components thereof, including unit-of-use systems and high-volume fillers, may be found in U.S. Pat. Nos. 9,373,065, 9,697,335, 9,944,419, 9,978,036, and 10,053,248, the entities of which are hereby incorporated by reference. However, it will be appreciated that the systems and components disclosed herein can be used in other contexts without departing from the scope of the present disclosure. For example, while embodiments described herein are directed to pharmaceutical containers C, the systems and methods of the present disclosure can dispense other temperature controlled articles, such as medical tests (e.g., COVID tests, FLU tests, and the like), food, etc.

Figure 2:
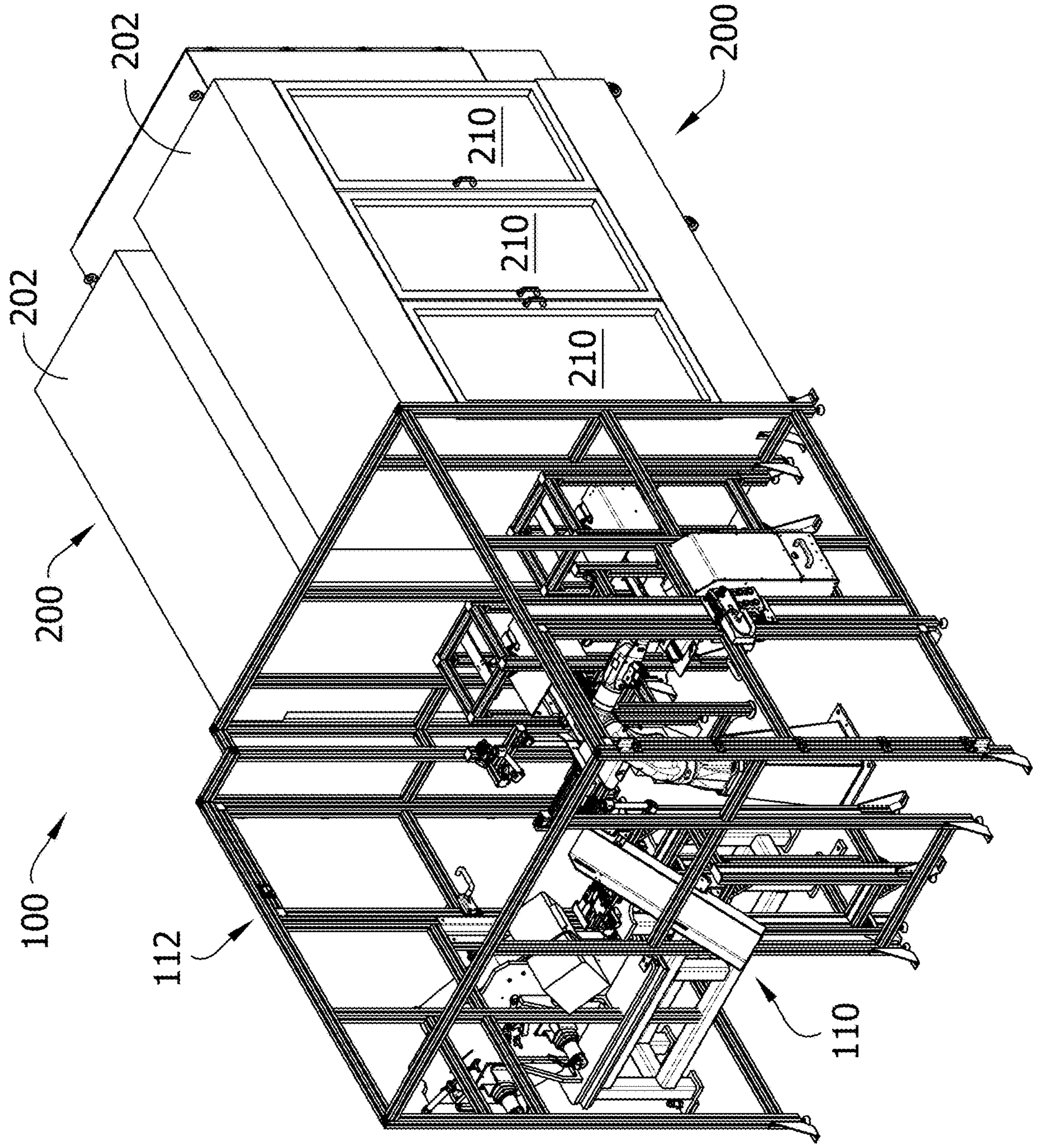
FIG. 2 is a perspective of a pharmaceutical container processing system according to one embodiment of the present disclosure.
Figure 3:
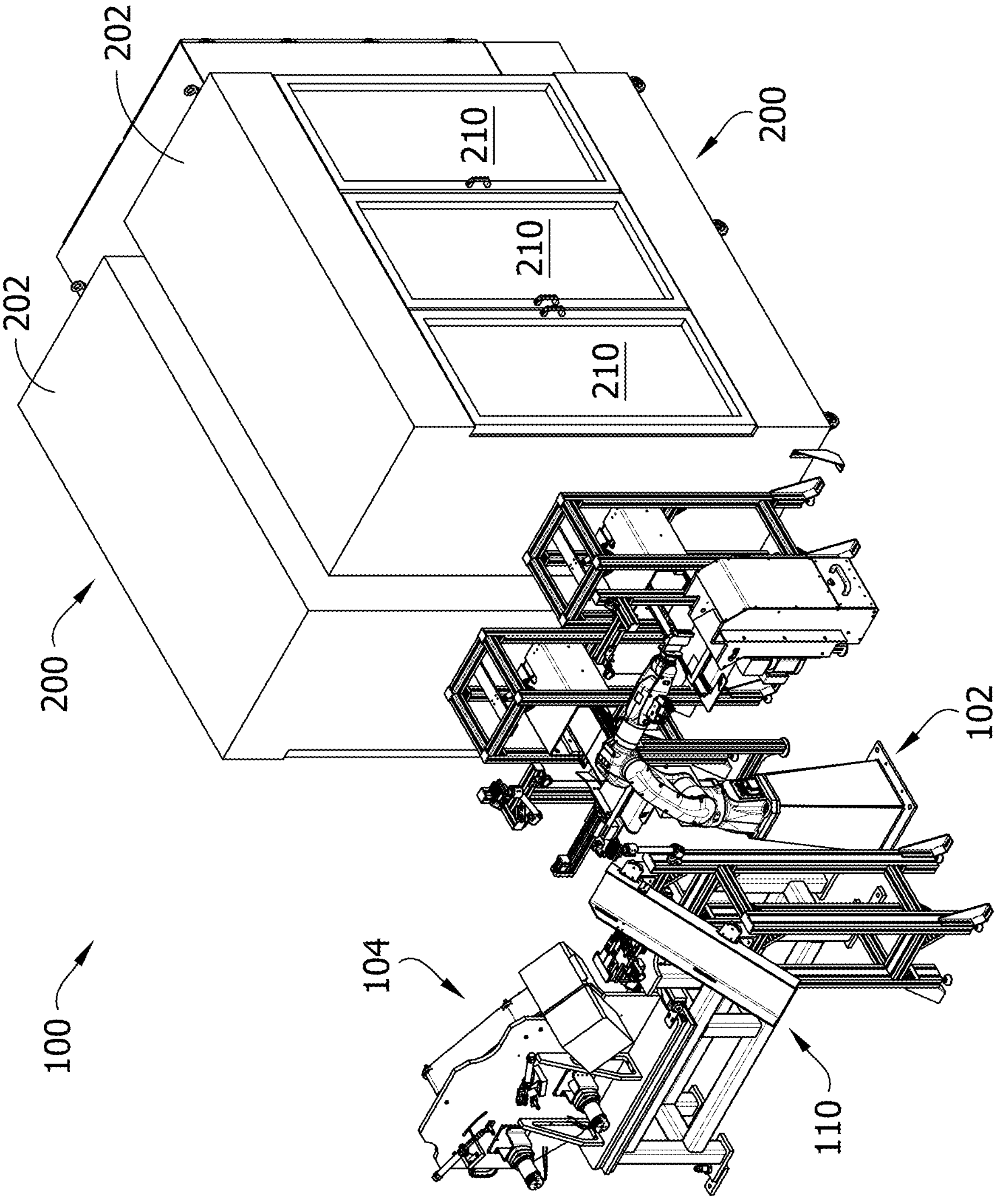
FIG. 3 is perspective of the pharmaceutical container processing system, with an enclosure hidden from view to reveal interior details.
Figure 4:
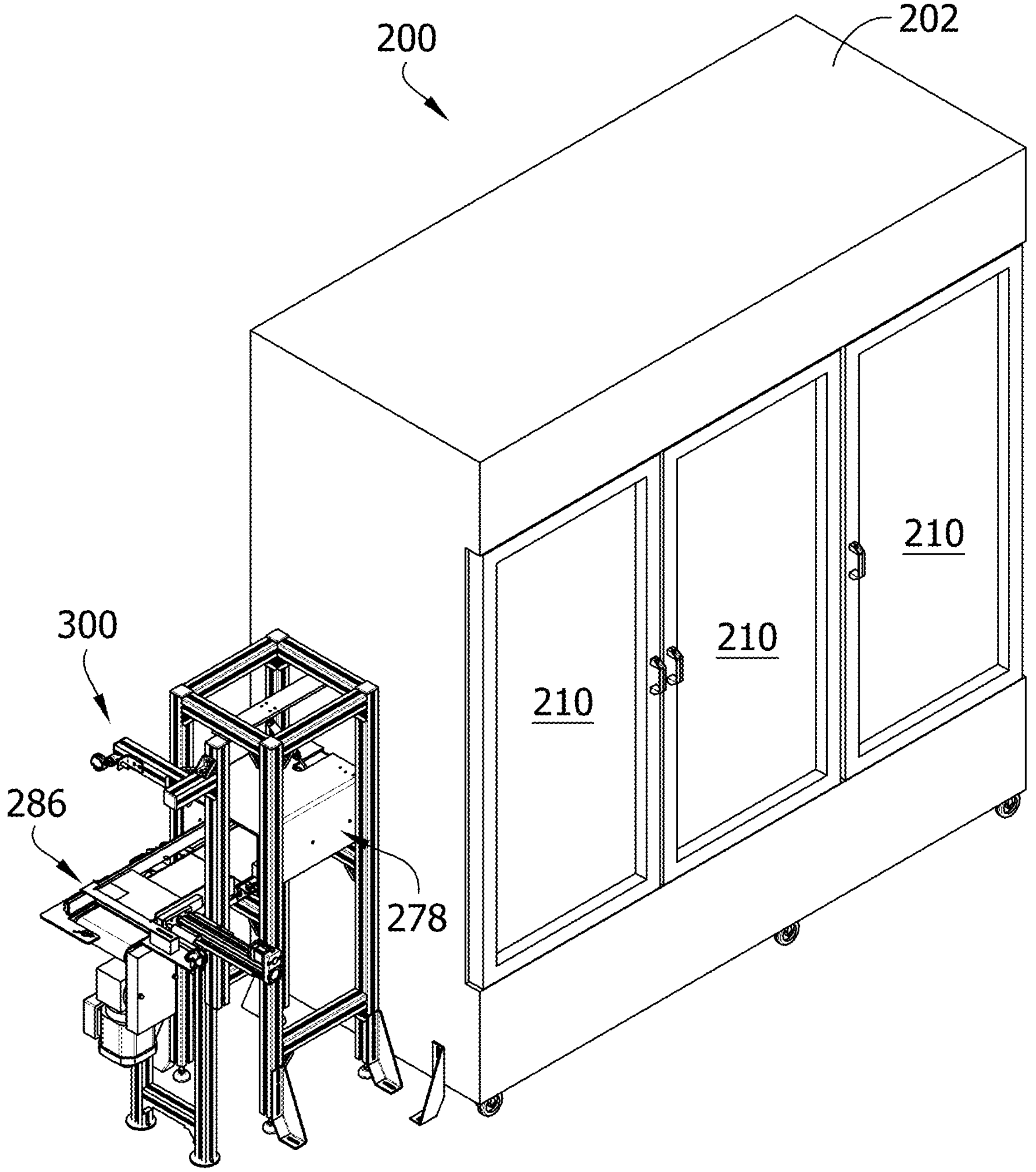
FIG. 4 is a perspective of a pharmaceutical container repository according to one embodiment of the present disclosure.
Figure 5:
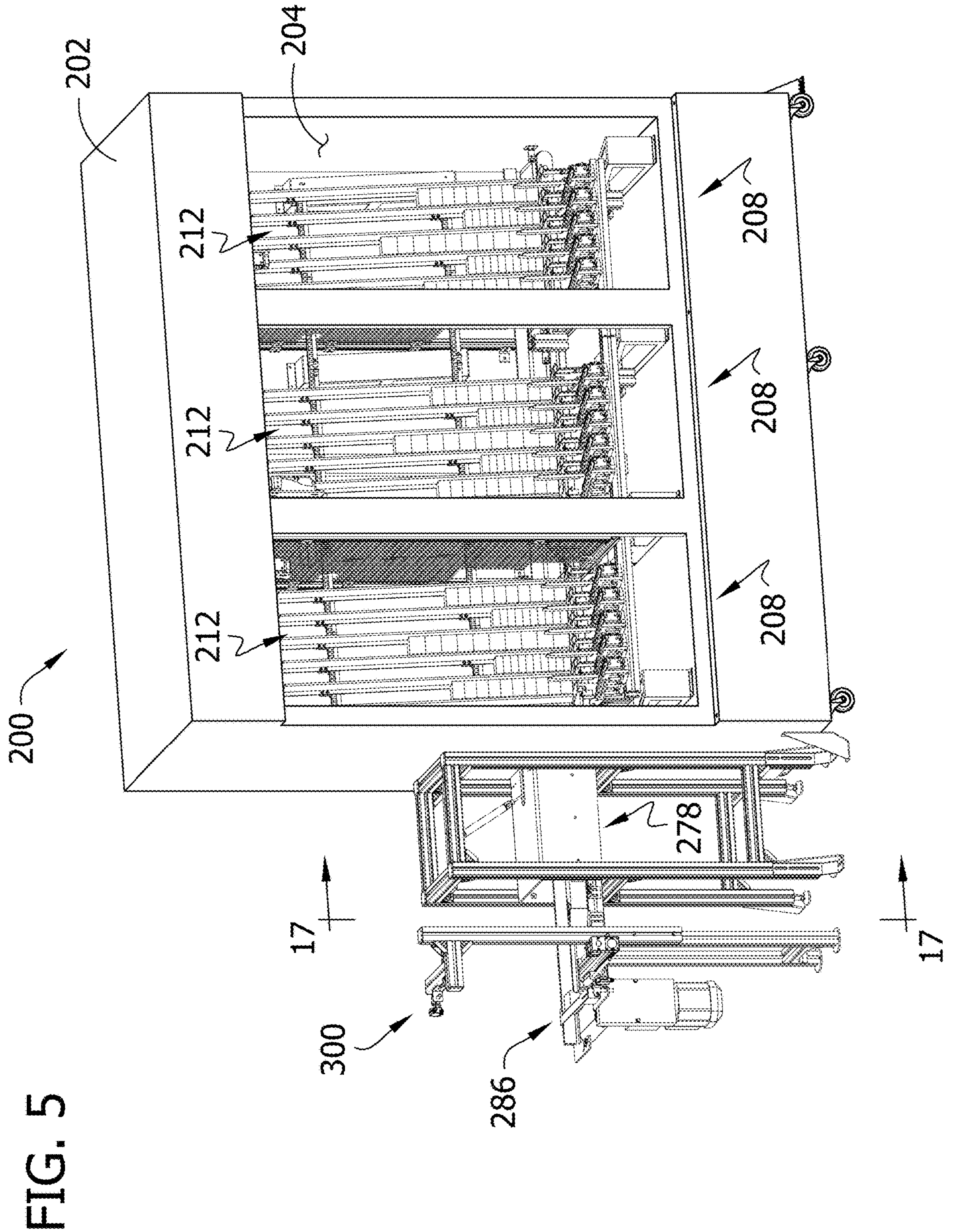
FIG. 5 is another perspective of the pharmaceutical container repository, with doors hidden from view to reveal interior details.
Figure 6:
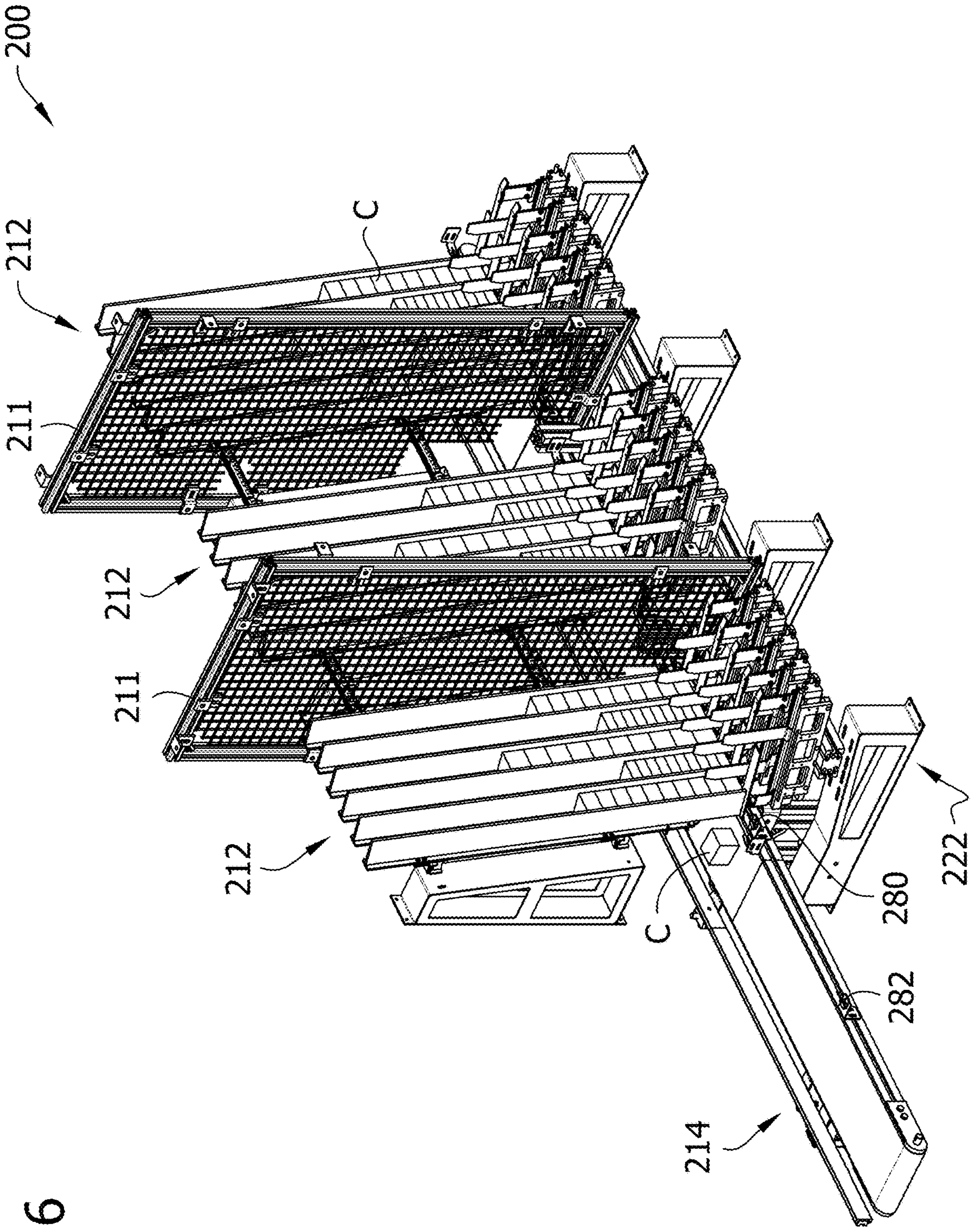
FIG. 6 is a front perspective of interior bays of the pharmaceutical container repository.
Figure 7:
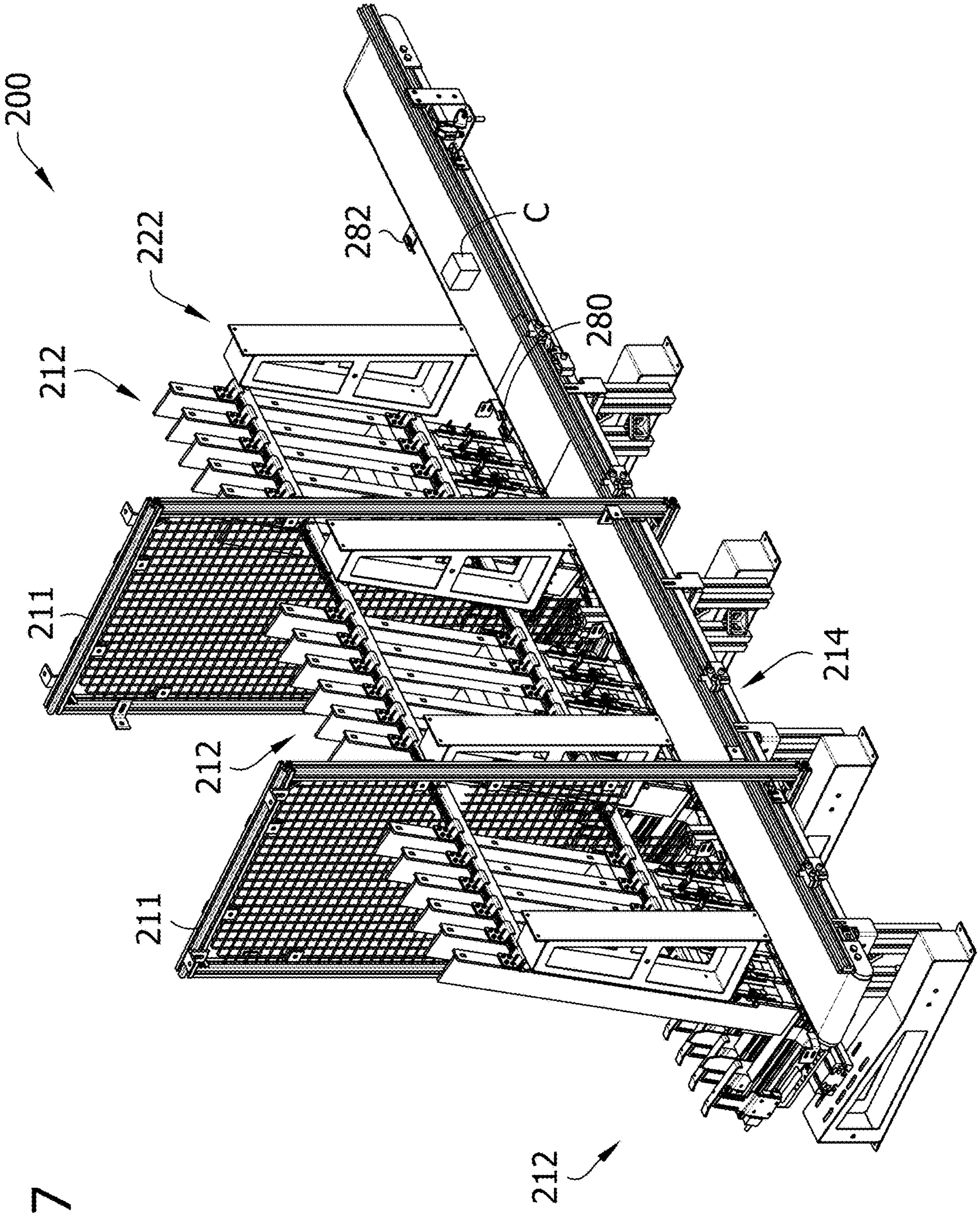
FIG. 7 is a rear perspective of the interior bays of the pharmaceutical container repository.

Referring to FIGS. 2 and 3, a pharmaceutical container processing system (e.g., pharmaceutical container processor) according to one embodiment of the present disclosure is indicated generally by reference numeral 100. The pharmaceutical container processing system 100 may be the pharmaceutical container processing system that is part of the pharmaceutical order processing system 10 of FIG. 1, or may be a standalone system. The pharmaceutical container processing system 100 processes prescription orders received by the system 10. Specifically, the pharmaceutical container processing system 100 may process a select category or subset of prescription orders received by the pharmaceutical order processing system 10, such as prescription orders comprising unit-of-use products. Accordingly, the pharmaceutical container processing system 100 comprises a unit-of-use system that processes pharmaceutical containers C that are unit-of-use products. The pharmaceutical container processing system 100 generally stores, labels, dispenses and packages the unit-of-use pharmaceutical containers C. The pharmaceutical container processing system 100 (e.g., system) processes the pharmaceutical containers C (e.g., a plurality of pharmaceutical containers) to fill prescription orders by storing, monitoring, labeling, dispensing, transporting, verifying and/or packaging the pharmaceutical containers to fill a prescription order received by the order processing system 10.

Referring to FIGS. 1-3, the system 100 includes at least one (e.g., two) container repositories 200, a container transporter 102, a labeler 104, a packaging device 106 such as a bagger, a conveyor 108, and/or a ramp or chute 110. Each container repository 200 is configured to hold and store pharmaceutical containers C. The two illustrated container repositories 200 are generally identical and placed back-to-back relative to one another. The container transporter 102 is configured to grab the container C from the container repositories 200 (e.g., from the pickup location 284 described below). In the illustrated embodiment, the container transporter 102 comprises a robot such as a six-axis robotic arm, although other robots are within the scope of the present disclosure. For example, the container transporter 102 may comprise a selective-compliance-articulated robotic arm, a cylindrical robot, a delta robot, a polar coordinate robot, a vertically articulated robot, a Cartesian coordinate robot or any other suitable device. After picking up the pharmaceutical container C, the container transporter 102 transports the pharmaceutical container to the labeler 104. The labeler 104 is configured to generate and provide a label (e.g., a patient specific label) for the pharmaceutical container C. In one embodiment, the labeler 104 may print and then present the label so that the container transporter 102 can bring the pharmaceutical container C into contact with the label. The label may include a pressure sensitive adhesive, which as a result of coming into contact with the pharmaceutical container C, causes the label to stick to the pharmaceutical container. After the label is applied to the pharmaceutical container C, the container transporter 102 either drops the pharmaceutical container on the conveyer 108 or on the chute 110.

If the container transporter 102 drops the pharmaceutical container C on the conveyor 108, the conveyor transports the pharmaceutical container to the packaging device 106 to package the pharmaceutical container C for shipping. In an example, an operator moves the pharmaceutical container C from the conveyor 108 to the packaging device 106. In an example, a robot may pick the container C from the conveyor 108 and place it in a shipping container, e.g., a bag, box or cooler, or the like. In other embodiments, the packaging device 106 may receive the pharmaceutical container C directly from the conveyor 108. The packaging device 106 (broadly, a shipping preparation device) can be any suitable device for bagging, packaging, sealing, boxing, etc., one or more containers C for shipping the containers to the patient. For example, the packaging device 106 may be a pre-formed bag bagger, a wrap seal bagger, or any other suitable device. The packaging device 106 is configured to package or bag one or more pharmaceutical containers C in a package (e.g., bag). The packaging device 106 generally prepares the container C for shipping to the patient. This may include adding corresponding literature regarding the prescription order for packaging with the pharmaceutical container C. The literature may be in the form of a slip, sheet, pamphlet, book, and the like and may contain information (e.g., directions) related to the pharmaceuticals in the pharmaceutical container and/or other information (e.g., patient information) related to the prescription order. When packing the pharmaceutical containers C, the packaging device 106 can also pack the corresponding literature (e.g., a literature pack) for the pharmaceutical containers C in the shipping package. After, the package is shipped to the patient.

The chute 110 leads to the conveyors 14 of the order processing system 10. If the container transporter 102 drops the pharmaceutical container C on the chute 110, the chute guides and delivers the container to the conveyor 14. For example, the dropped pharmaceutical container C may slide down the chute 110 and into a bin (not shown) on the conveyor 14, which may or may not include containers from other parts of the pharmacy 10. The conveyor 14 can then transport the bin to other locations in the pharmacy 10 for further processing.

The system 10 includes an enclosure 112 (hidden from view in FIG. 3). The enclosure 12 defines (e.g., encloses) a processing area. In general, a portion of the container repositories 200, the container transporter 102, a portion of the labeler 104, a portion of the conveyor 108, and a portion of the chute 110 are disposed in the processing area. The enclosure 112 helps keep the processing area and components therein clean.

Referring to FIGS. 3-7, the container repository 200 is configured to hold and store a supply of pharmaceutical containers C. The container repository 200 receives and holds the pharmaceutical containers C and can hold many different types of pharmaceutical containers (e.g., types of pharmaceuticals). The container repository 200 can be configured to hold pharmaceutical containers C of different shapes and of generally any size. For example, the container repository 200 can be configured for boxes of generally any shape and size. In one embodiment, the pharmaceutical containers C are manually loaded into the container repository 200 by an operator.

The container repository 200 includes a cabinet or housing 202 having an interior 204. The interior 204 is sized and shaped to hold the supply of the pharmaceutical containers C. In one embodiment, the interior 204 is refrigerated to be able to store pharmaceutical containers C that need to be stored in refrigerated (e.g., 40° F. or below, or below freezing) state. The container repository 200 can include a refrigeration system 206 (FIG. 20) to refrigerate the interior 204 of the cabinet 202. The refrigeration system 206 may be generally contained within a lower position of the cabinet. The refrigeration system 206 may be a vapor-compression refrigeration system (e.g., evaporator, condenser, compressor, expansion valve) although other refrigeration systems can be used without departing from the scope of the present disclosure. In this embodiment, the cabinet 202, or broadly, the container repository 200, may be considered a refrigerator (e.g., a refrigerated container repository).

The container repository 200 includes a container holder 212 (broadly, at least one container holder) disposed in the interior 204 of the cabinet 202. The container holder 212 holds and stores the pharmaceutical container C in the interior 204 of the cabinet 202. In the illustrated embodiment, the interior 204 of the cabinet 202 is divided into bays 208, which each bay including at least one container holder 212. Broadly, the individual container holders 212 may be considered collectively as a single container holder. The cabinet 202 also includes a refill door 210 for each bay. In one embodiment, to reduce heat exchange when the door 210 is open, the container repository 200 can include a blower that creates an air curtain across the opening and/or a flexible curtain (e.g., strip curtain) covering the opening. An operator can open the door 210 to refill the container holder 212 for that particular bay 208 with pharmaceutical containers C. The cabinet 202 may include dividers 211 (e.g., dividing walls) separating the bays 208 in the interior 204. In the illustrated embodiment, the divider 211 comprise a mesh or wire formative wall which allows air to move there through for temperature regulation. In the illustrated embodiment, the cabinet 202 includes three bays 208, although the cabinet can have more or fewer bays without departing from the scope of the present disclosure.

The container repository 200 includes a container transporter 214 at least partially disposed in the interior 204 of the cabinet 202. The container transporter 214 is configured to transport the pharmaceutical containers C after the containers leave (e.g., are removed from) the container holders 212. In particular, the container transporter 214 is arranged to receive the pharmaceutical containers C directly from the container holders 212. In the illustrated embodiment, the container transporter 214 comprises a conveyor (e.g., an endless conveyor belt), although other types of container transporters can be used without departing from the scope of the present disclosure. The conveyor extends along each container holder 212, and out through an opening 216 (FIG. 17B) in a side wall of the cabinet 202.

Referring to FIGS. 6-16, the container holders 212 are each generally identical. Accordingly, one container holder 212 will now be described with the understanding the description applies to each container holder 212. The container holder 212 includes a plurality of container receivers 218 (broadly, at least one container receiver) and a plurality of container dispensers 220 (broadly, at least one container dispenser). The container holder 212 is supported in the interior 204 of the cabinet 202 by a frame 222.

The container receivers 218 are each generally identical. Accordingly, one container receiver 218 will now be described with the understanding the description generally applies to all container receivers. The container receiver 218 has a container interior 224 sized and shaped to receive and hold a stack of the pharmaceutical containers C (see FIGS. 6 and 10). The container interior 224 is elongate. In general, the container receiver 218 includes a rear wall and opposite left and right side walls bounding the rear and opposite left and right sides, respectively, of the container interior 224. The container receiver 218 also includes a bottom wall bounding the bottom of the container interior 224. Together, the rear wall, the side walls, and the bottom wall support and hold the pharmaceutical containers C in the stack. In the illustrated embodiment, the container holder 212 includes a plurality (broadly, at least two) container dividers 226. The container dividers 226 form the container receivers 218. The container dividers 226 are all generally identical. In the illustrated embodiment, the pharmaceutical containers C are boxes stacked in the container holders 212. It is understood the container holders 212 can hold other types of containers, such as bottles (e.g., the bottles stacked one on top of another (the cap of one bottle in physical contact with a bottom of an adjacent bottle)). In this case, the push surface 250 (described in more detail below) would push one bottle out at a time from the container holder 212.

Figure 12:
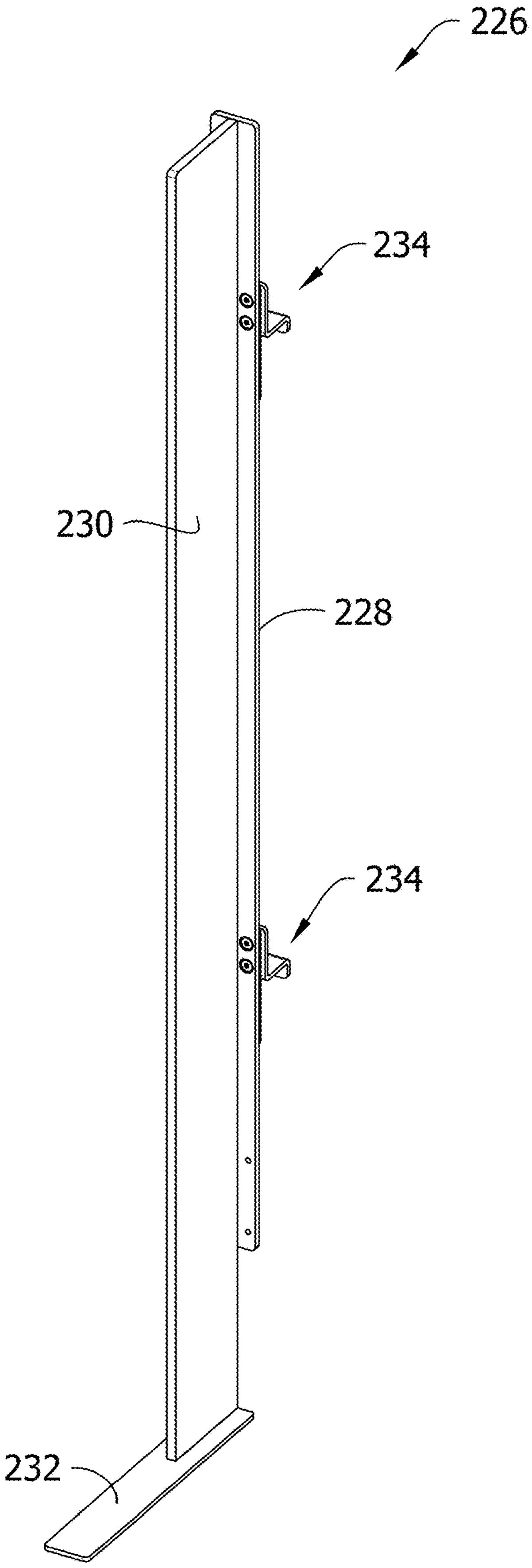
FIG. 12 is a front perspective of a divider of the container holder.
Figure 13:
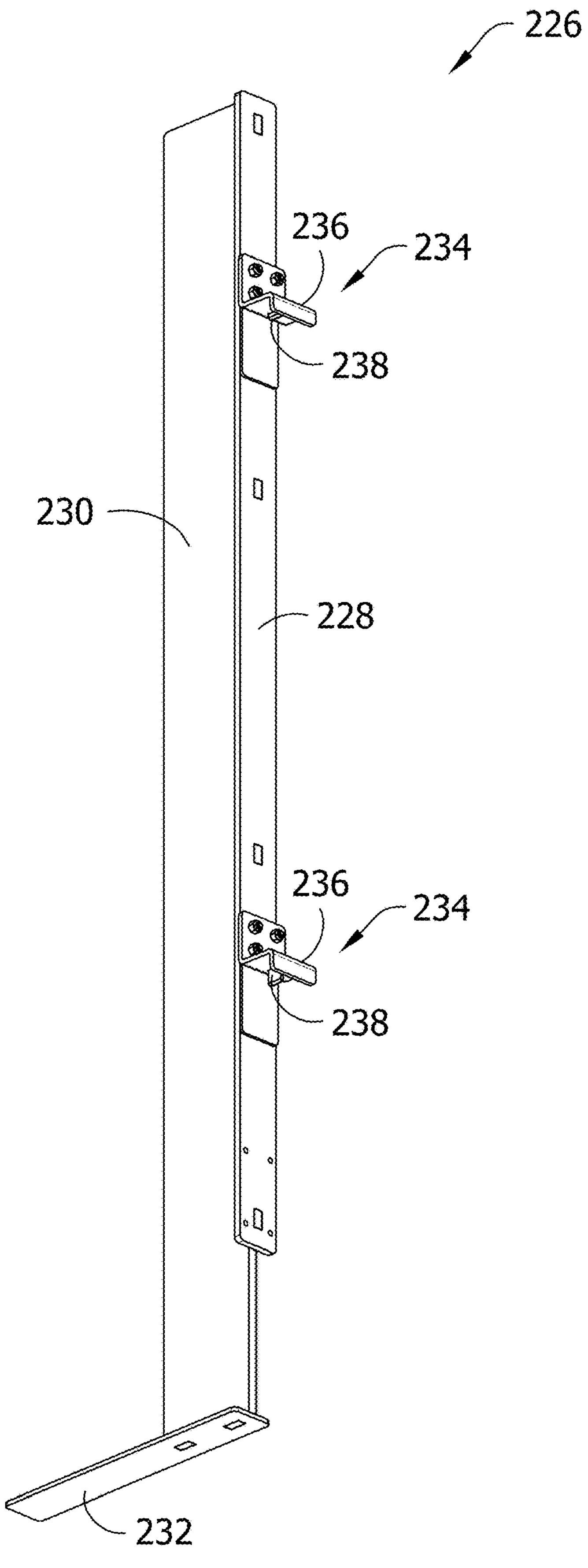
FIG. 13 is a rear perspective of the divider.
Figure 14:
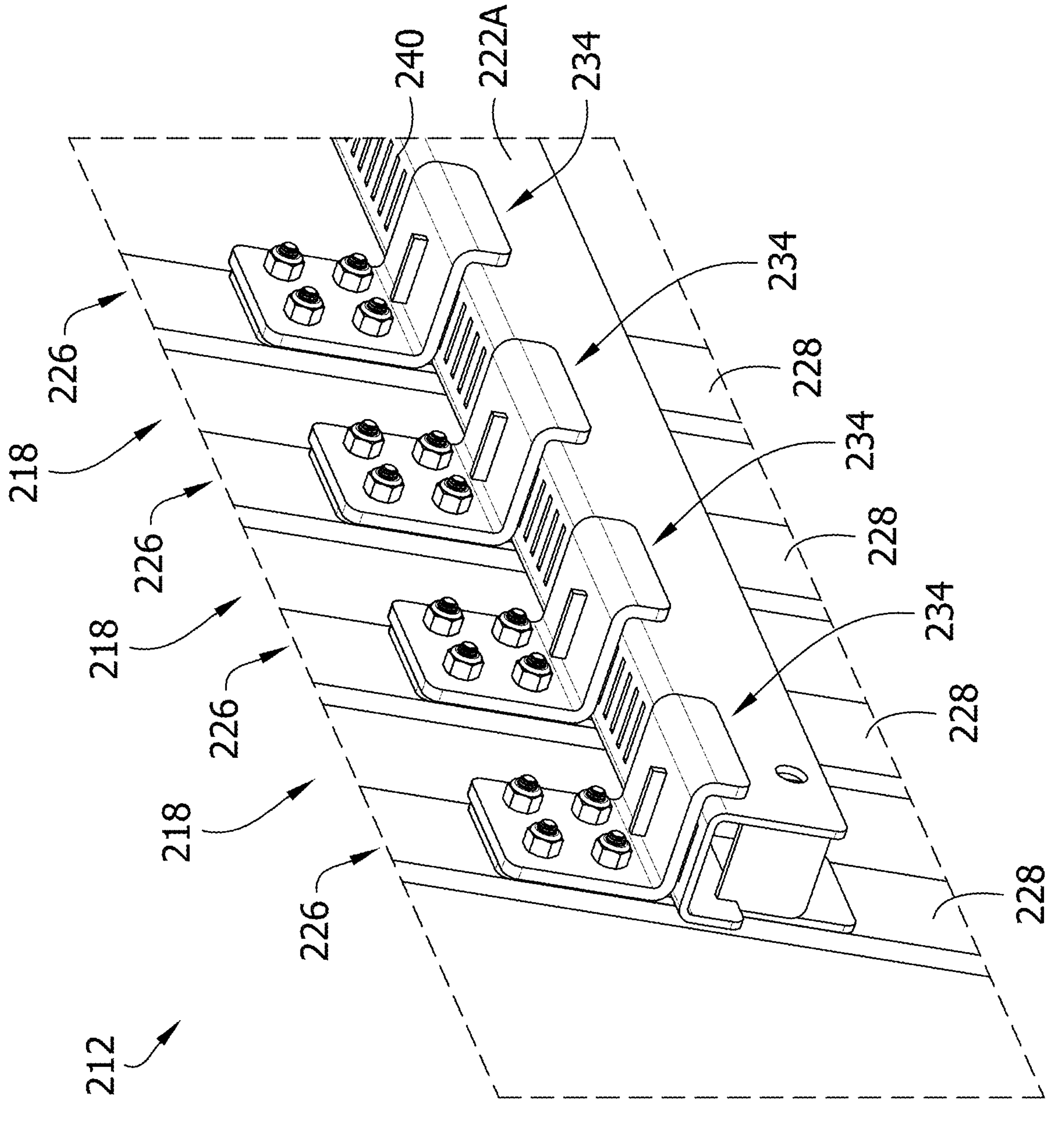
FIG. 14 is an enlarged, fragmentary perspective of dividers of the container holder attached to a frame.
Figure 15:
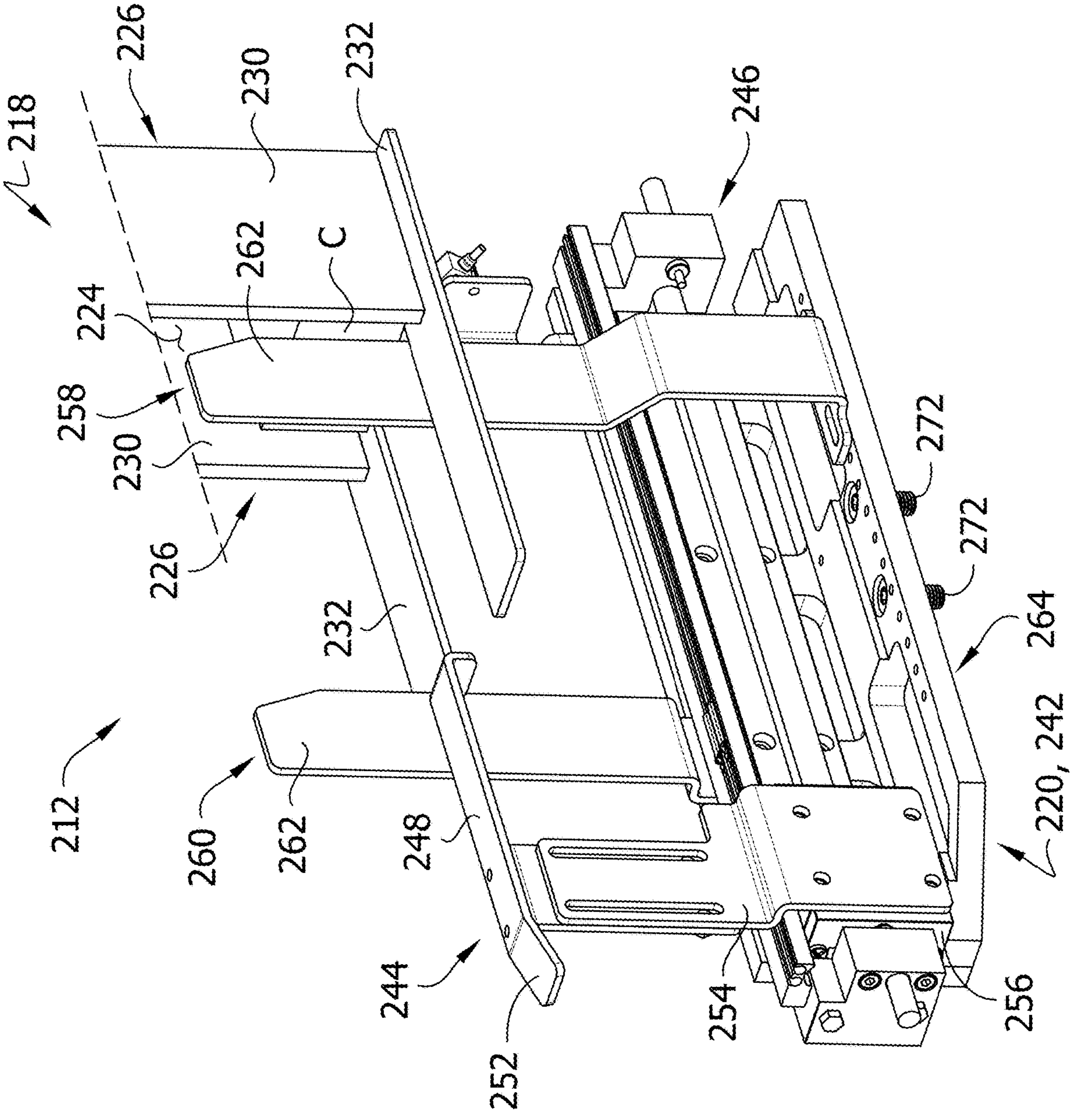
FIG. 15 is an enlarged, fragmentary front perspective of a container pusher and a container receiver of the container holder.

Referring to FIGS. 12-14, each container divider 226 includes a rear wall 228 and a dividing wall 230. The dividing wall 230 is oriented generally perpendicularly to the rear wall and extends forward from the rear wall. The container divider 226 also includes a foot or bottom wall 232 at the bottom of the dividing wall 230. The foot 232 is oriented generally perpendicularly to the dividing wall 230. The rear wall 228 and the foot 232 extend pass both sides of the dividing wall 230, for reasons that will become apparent. The foot 232 may also extend pass the front (e.g., front edge) of the dividing wall 230. The foot 232 is spaced from the lower end of the rear wall 228 thereby leaving a gap through which the pharmaceutical containers C can move through as they are dispensed. The container divider 226 includes two frame connectors or hooks 234. The frame connectors 234 are connected to the rear wall 228 and vertically spaced apart from one another. The frame connectors 234 attach (e.g., removeably attach) the container divider 226 to the frame 222. Preferably, the container dividers 226 are moveable or attachable to the frame 222 at set discrete increments. This ensures the container divider 226 (e.g., the dividing wall 230) is oriented vertically when coupled to the frame 222. If the container divider 226 was infinitely positionable on the frame 222, the container divider would be more likely to become skewed with respect to the vertical, which can impact the ability for the stack of pharmaceutical containers C to be dispensed by the container holder 222. In the illustrated embodiment, each frame connector 234 includes a support bracket 236 configured to rest on a rail or support 222A of the frame 222. The frame connector 234 includes a tab or projection 238 extending downward from the support bracket 236. The tab 236 is sized and shaped to fit into a corresponding recess or opening 240 of the rail 222A. The rails 222A includes a plurality of recesses 240 spaced apart along its length at discrete intervals. The recesses 240 define the set discrete positions the dividing wall 230 can be positioned in along the rail 222A when the container divider 226 is coupled to the frame 222.

When connected to the rails 222A of the frame 222, two adjacent container dividers 226 generally form one container receiver 218. The rear walls 228 of the two container dividers 226 (specifically, the portions of the rear walls 228 extending toward each other from the respective dividing walls 230) form the rear wall of the container receiver 218, which supports the rear of the pharmaceutical containers C in the stack. Each dividing wall 230 of the two adjacent container dividers 226 forms one of the side walls of the container receiver 218, which support the sides of the pharmaceutical containers C in the stack. Each side wall of the container receiver 218 bounds one side of the container receiver 224. The feet 232 of the two container dividers 226 (specifically, the portions of the feet extending toward each other from the respective dividing walls 230) generally form the bottom wall of the container receiver 218, which supports the bottom-most pharmaceutical container C in the stack. The feet 232 extend forward of the dividing walls 230 to support pharmaceutical container C of longer lengths.

The ability to position the container dividers 226 at different positions relative to one another, along the rail 222A, allows the container interior 224 of the container receiver 218 to be adjusted to conform a width of the container interior to pharmaceutical containers C of different widths. In general, at least one of the side walls (e.g., dividing walls 230) of the container receiver 218 is moveable relative to the other side wall (e.g., other dividing wall) to change a width of the container interior 224 (e.g., the distance between the side walls). Specifically, the at least one side wall is moveable at the set discrete increments (relative to the other side wall), as described above. In the illustrated embodiment, it is appreciated that both side walls (e.g., dividing walls 230) are independently moveable (e.g., moveable at the set discrete increments). This allows the width of the container interior 224 to be adjusted to fit different sizes of pharmaceutical containers C. The container dividers 226 are connectable and disconnectable to the frame 222 without the use of tools, allows an operator to easily and quickly adjust the container dividers as needed. In one embodiment, the width of the container interior 224 is about ¼ inch greater than the width of the pharmaceutical containers C held therein. This provides enough clearance to allow the pharmaceutical containers to be easily placed in the container interior 224 and move downward as containers are removed from the bottom of the stack (as described below). In one embodiment, a pair of container dividers 226 may be joined together, such as by one or more brackets extending there between (such as between the rear walls 228). This allows the container interior 224 of the container receiver 218 to be filled with pharmaceutical containers C while the container receiver is outside the interior 204 of the cabinet 202 and then positioned in the interior of the cabinet (e.g., mounted on the rails 222A of the frame 222) after the loading. This may make it quicker to refill or restock the container holder 212, over loading the container receiver when it is in the interior 204 of the cabinet 202. In this embodiment, the distance between the dividing walls 230 (broadly, side walls of the container receiver 218) may be fixed (e.g., cannot be changed).

Other configurations of the container receiver 218 can be used without departing from the scope of the present disclosure.

Referring to FIGS. 8-11, 15, and 16, the container dispensers 220 are each generally identical. Accordingly, one container dispenser 220 will now be described with the understanding the description generally applies to all container dispensers. The container dispenser 220 is associated with one of the container receivers 218. The container dispenser 200 removes the pharmaceutical containers C one at a time from the corresponding container receiver 218. The container dispenser 220 is arranged to remove the bottom-most pharmaceutical container C in the stack of pharmaceutical containers from the stack of the pharmaceutical containers help by its corresponding container receiver 218. In the illustrated embodiment, the container dispenser 220 comprises a pusher 242, although other types of container dispensers can be used without departing from the scope of the present disclosure. The pusher 242 is configured to push the bottom-most pharmaceutical container C out of the stack of pharmaceutical containers held by the corresponding container receiver 218.

The pusher 242 includes a push bracket 244 and a prime mover 246. The prime mover 246 is operatively coupled to the push bracket 244 to move the push bracket. The prime mover 246 moves the push bracket from a first or starting position (FIGS. 8, 15, and 16) to a second or pushed position (FIG. 9). The push bracket 244 moves a linear path between the starting and pushed positions. This linear path is generally perpendicular to the container interior 224 (e.g., perpendicular to the orientation of the stack of pharmaceutical containers C). In the illustrated embodiment, the prime mover 246 is a pneumatic linear actuator, although other types of prime movers (e.g., electric linear actuator, electric motor, etc.) may be used without departing from the scope of the present disclosure. The push bracket 244 includes a push surface 250. The push surface 250 is arranged to engage the bottom-most pharmaceutical container C (e.g., an end thereof) in the stack of the pharmaceutical containers held by the corresponding container receiver 218 to push the bottom-most pharmaceutical container out of the stack of pharmaceutical containers. The push surface 250 pushes the bottom-most pharmaceutical container C as the push surface is moved from the starting position toward (e.g., to) the pushed position by the prime mover 246. As used herein, the movement of the push bracket 244 (e.g., the push surface 250) from the starting position to the pushed position is called a push stroke and the movement of the push bracket from the pushed position to the starting position is called a return stroke. The push bracket 244 removes (e.g., pushes) the bottom-most pharmaceutical container C from the container receiver 218 during the push stroke and returns to the starting position at the end of the return stroke to be in position to remove another pharmaceutical container form the container receiver. The pusher 242 pushes the bottom-most pharmaceutical container C through the gaps between the rear walls 228 and feet 232 of the container dividers 226 (broadly, an opening at the bottom of the bottom wall of the container receiver 218) to remove the container from the stack and move the container onto the container transport 214. As illustrated, the container transporter 214 is arranged to receive the pharmaceutical containers C from the container holder 212 (e.g., the container receiver 218) as the containers are removed (e.g., pushed) from the container receiver by the container dispenser 220. The container transport 214 extends behind the container dispenser 220 and the conveyor surface (e.g., top surface of the conveyor belt) is at an elevation slightly below the lowest elevation of the feet 232.

The push bracket 244 may also include a support surface 248. The support surface 248 is generally planar and oriented generally perpendicular to the push surface 250. The support surface 248 is arranged to support a subsequent bottom-most pharmaceutical container C (e.g., the pharmaceutical container that is second from the bottom and resting on the bottom-most pharmaceutical container) in the stack of containers as the pusher 242 pushes the bottom-most container out of the stack of containers. The support surface 248 supports the stack of pharmaceutical containers C in the container receiver 218 and prevents the stack from dropping down to the feet 232 (broadly, bottom wall of the container receiver 218) as the bottom-most pharmaceutical container C is pushed. The support surface 248 supports the stack of pharmaceutical containers C during the push stroke (e.g., later portion thereof) and during the return stroke (e.g., an early portion thereof). During the return stroke, once the push bracket 244 (e.g., support surface 248) clears the bottom of the subsequent bottom-most pharmaceutical container C in the stack, the stack drops or falls down to the feet 232. The forming subsequent bottom-most pharmaceutical container C is now the bottom-most pharmaceutical container C waiting to be pushed by the pusher 242. The push bracket 244 includes a ramp surface 252 at the end of the support surface 248 opposite the push surface 250. The ramp surface 252 extends at an inclined angle relative to the support surface 248. The ramp surface 252 reduces the chance of the push bracket 244 catching on the subsequent bottom-most pharmaceutical container C (such as on a lip or edge thereof) and moving the subsequent bottom-most pharmaceutical container with the push bracket 244 and/or damaging (e.g., ripping, tearing, opening, etc.) the subsequent bottom-most pharmaceutical container during the return stroke.

The support surface 248 and the push surface 250 are each moveable relative to a height of the container interior 224 of the container receiver 218 to adjust the position of these surfaces along the height of the container interior. This allows the support surface 248 and the push surface 250 (broadly, the pusher 242) to be adjusted to configure the pusher for pharmaceutical containers C of different heights. Preferably, the pusher 242 is arranged (e.g., the support surface 248 and push surface 250 moved up or down) so that the support surface 248 is just below the top of the bottom-most pharmaceutical container C when the push surface 250 engages the container. In other words, the pusher 242 is arranged so that the support surface 248 is just below a plane that is coplanar with the top of the bottom-most pharmaceutical container C. This way the pusher 242 does not push the subsequent bottom-most pharmaceutical container C when pushing the bottom-most pharmaceutical container. In the illustrated embodiment, the push bracket 244 is connected to a push support 254 with fasteners 256 (e.g., bolts). The fasteners 256 (broadly, retainers) extend through slots in the push support 254, allowing the push bracket 244 to be selectively moved up and down relative to the push support, by selectively tightening and loosening the fasteners. The push support 254 is mounted to a moveable carriage 256 of the prime mover 246. The push bracket 244 includes a plate that defines the support surface 248, one tab extending from one end of the plate defining the push surface 250 and another tab extending from the opposite end of the plate defining the ramp surface 252. Other configurations of the pusher 242 may be used without departing from the scope of the present disclosure.

The container holder 212 includes a pair (broadly, at least one) of stops 258, 260 (e.g., return stops) for each container dispenser 220 (e.g., pusher 242). The return stops 258, 260 are arranged to engage the subsequent bottom-most pharmaceutical container C in the stack of containers to inhibit the subsequent bottom-most container from moving relative to the stack of containers during the return stroke (e.g., when the push surface 250 moves from the pushed position toward the starting position). Because the subsequent bottom-most pharmaceutical container C rest on the support surface 248 during the first portion of the return stroke, without the return stops 258, 260, the stack of pharmaceutical containers C would move with the push bracket 244 and fall out of the container receiver 218. The return stops 258, 260 are moveable and selectively fixable in position relative to the container receiver 218 (e.g., the container interior 224). The return stops 258, 260 are moveable in a direction parallel to the path of the push bracket 244 (e.g., toward and away from the container interior 224). This allows the position of the return stops 258, 268 to be changed to adjust the return stops based on the length (broadly, size) of the pharmaceutical containers C held in the container receiver 218. In the illustrated embodiment, the returns stops 258, 260 each comprise a fin (e.g., stop wall) 262 that can extend up through the gap between the two feet 232. The fins 262 are tall enough to engage the subsequent bottom-most pharmaceutical container C when the subsequent bottom-most pharmaceutical container is supported by the support surface 248. In the illustrated embodiment, the fin 262 of the first return stop 258 is mounted on a base 264 (which also supports the prime mover 246) with fasteners (not shown). The fasteners (broadly, retainers) extend through slots (FIG. 15) in the first return stop 258 and into openings in the base. The slots allow the first return stop 258 to be moved toward and away from the container interior 224 of the container receiver 218 as needed, by selectively tightening and loosening the fasteners. Somewhat similarly, the fin 262 of the second return stop 260 is also mounted to the base 264. Fasteners (not shown) (broadly, retainers) extend through a slot (FIG. 16) in the base 264 and into openings in the fin 262 of the second return stop 260. The slot in the base 264 allow the second return stop 260 to be moved toward and away from the container interior 224 of the container receiver 218 as needed, by selectively tightening and loosening the fasteners. Other configurations of the return stops 258, 260 may be used without departing from the scope of the present disclosure. In operation, one or both of the return stops 258, 260 may be used. Further, a return stop 258, 260 not being used can be removed from the container holder 212. In one example, an operator may choose to use only one of the return stops 258, 260 for pharmaceutical containers of smaller widths and both returns stops for pharmaceutical containers of larger widths. It has been found that using both return stops 258, 260 prevents the subsequent bottom-most pharmaceutical container C (broadly, the entire stack) from twisting in the container interior 224 during the return stroke, which could otherwise implead subsequent dispensing of the containers.

Figure 11:
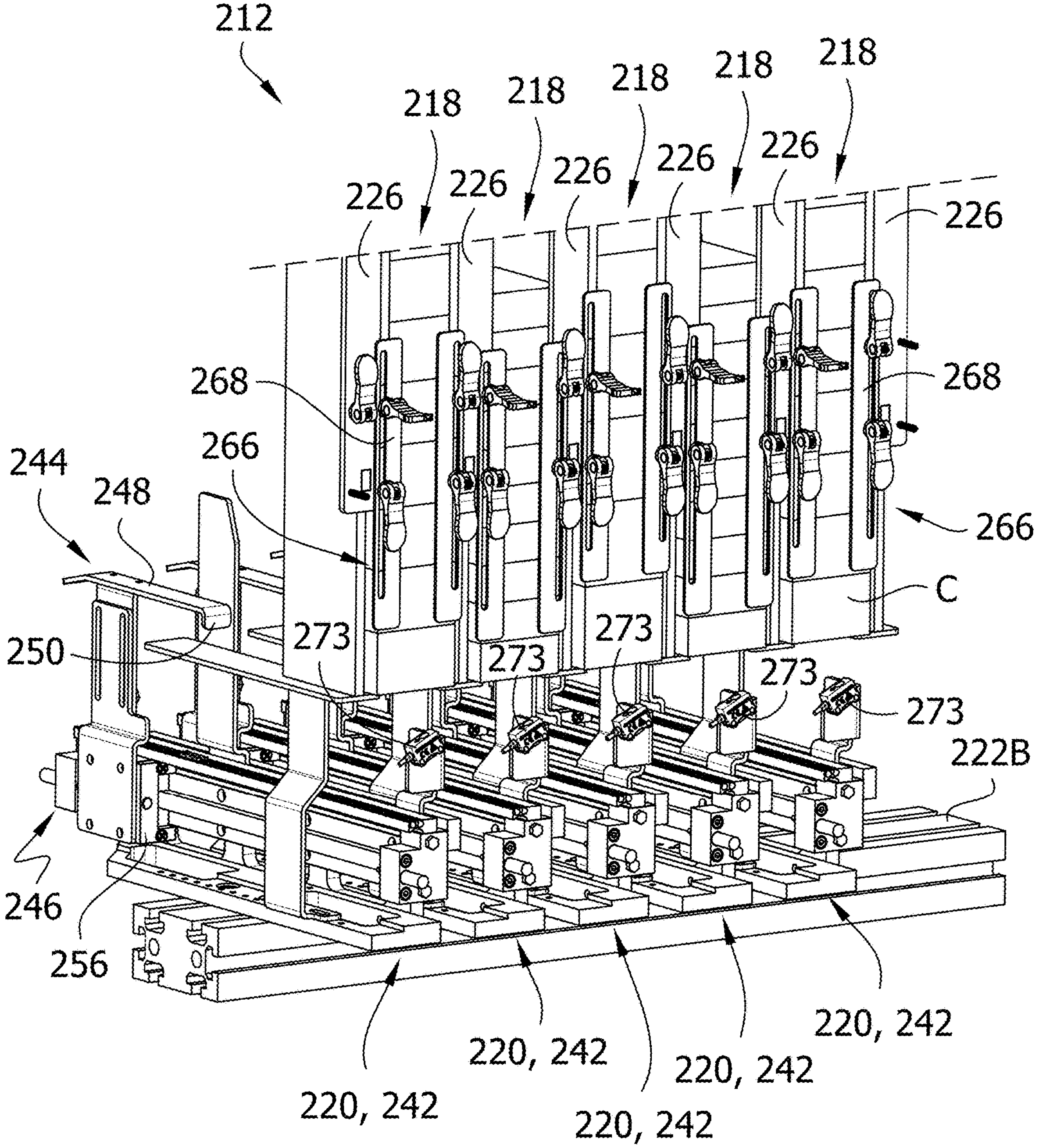
FIG. 11 is an enlarged, fragmentary rear perspective of the container holder.
Figure 16:
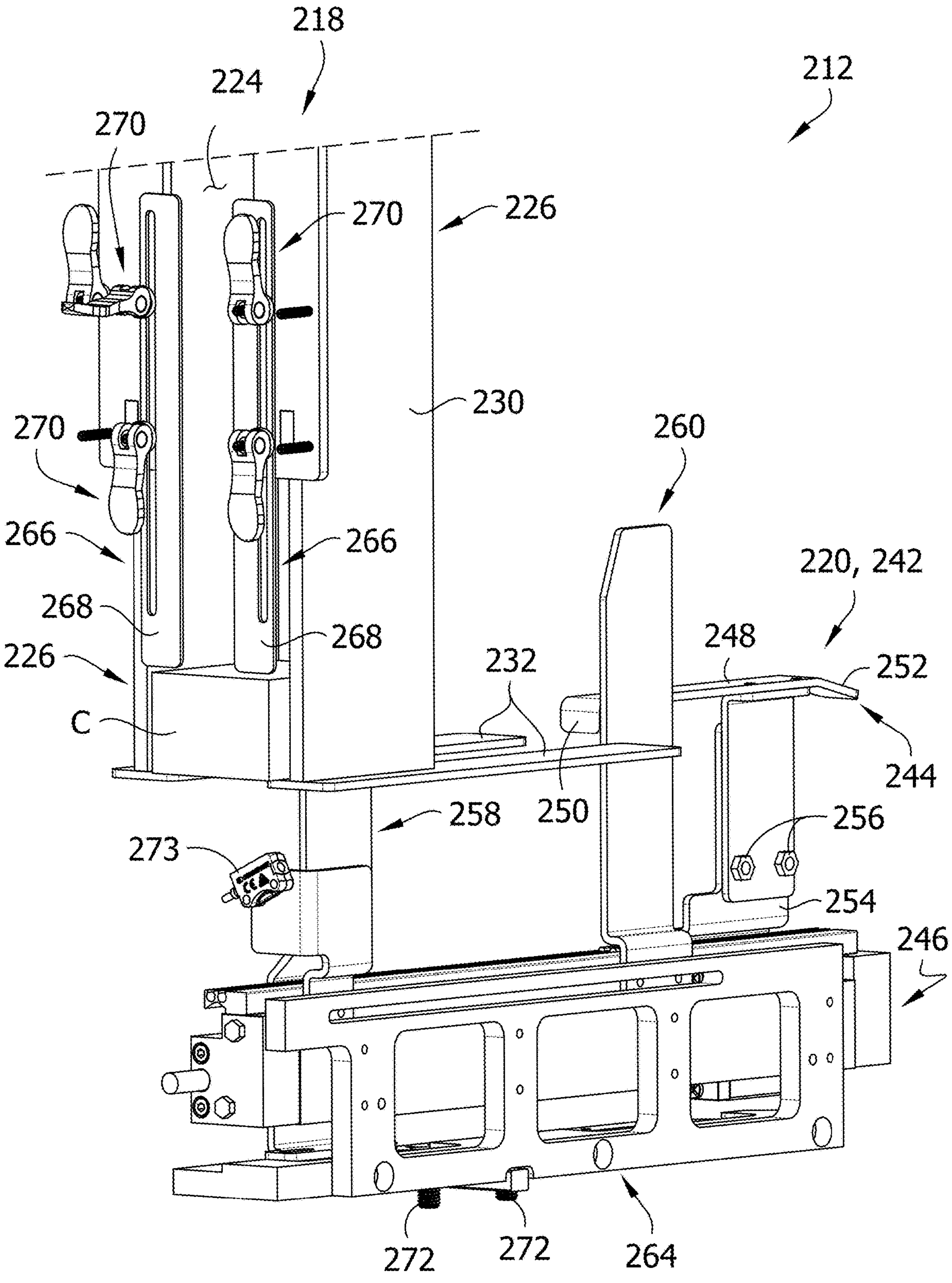
FIG. 16 is an enlarged, fragmentary rear perspective of the container pusher and the container receiver of the container holder.

Referring to FIGS. 11 and 16, the container holder 212 also includes a pair (broadly, at least one) of stops 266 (e.g., push stops) for each container dispenser 220/container receiver 218 (e.g., pusher 242). The push stops 266 are arranged to engage the subsequent bottom-most pharmaceutical container C in the stack of containers to inhibit the subsequent bottom-most container from moving with the bottom-most pharmaceutical container during the push stroke (e.g., when the bottom-most container is removed from the stack of containers). Because the subsequent bottom-most pharmaceutical container C rest on top of the bottom-most pharmaceutical container during a portion of the push stroke, without the push stops 266, the subsequent bottom-most pharmaceutical container would move with the push bracket 244 and out of the container receiver 218. In general, the rear wall of the container receiver 218 prevents the entire stack from moving with the bottom-most pharmaceutical container C. The push stops 266 are moveable and selectively fixable in position relative to the bottom wall (e.g., feet 232) of the container receiver 218 (e.g., the bottom of the container interior 224). The return stops 266 are moveable in a direction parallel to the height of the container interior 224 (e.g., toward and away from the feet 232). This allows the position of the push stops 260 to be changed to adjust the push stops based on the height (broadly, size) of the pharmaceutical containers C held in the container receiver 218. In the illustrated embodiment, the push stops 266 each comprise a stop wall 268 that extends down from the rear walls 228 of one of the container dividers 226. The stop walls 268 extend down far enough to overlap the subsequent bottom-most pharmaceutical container C. In the illustrated embodiment, each stop wall 268 is mounted to the rear wall 228 of a container divider with one or more cam levers 270 (broadly, retainers). The shaft of the cam lever(s) 270 extend through a slot in the stop wall 268. The slot allows the push stop 266 (e.g., stop wall 268) to be moved up and down as needed, by selectively tightening and loosening the cam lever(s) 270. Other configurations of the push stop 266 may be used without departing from the scope of the present disclosure. In operation, one or both of the push stops 266 may be used.

Referring to FIGS. 8-10, 15, and 16, the container dispenser 220 is supported by the frame 222. In particular, the base 264 of the container dispenser 220 is mounted to a rail or support 222B of the frame. Preferably, the container dispenser 220 is moveable and selectively positionable along the rail 222B of the frame 222. This allows the container dispenser 220 (e.g., pusher 242) to be aligned with its corresponding container receiver 218. Specifically, this allows the container dispenser 220 (e.g., pusher 242) to be center between the side walls of the container receiver 218. As mentioned above, the container dividers 226 are mountable at different lateral positions along the frame 222. Thus, the container dispenser 220 is also mountable at different lateral positions along the frame 222, to be able to match the container dividers. In other words, the container dispenser 220 is moveable relative to the container interior 224 of its associated container receiver 218 in a direction that is parallel to the width of the pharmaceutical container C (e.g., width of the container interior). In the illustrated embodiment, the container dispenser is infinitely positionable along the rail 222B. The rail 222B includes t-slots and the container dispenser 220 include fasteners 272 (broadly, retainers) extending through the base 264 into one of the t-slots. The fasteners 272 are secured in the t-slots with nuts (disposed in the t-slots). The fasteners 272 allow the container dispenser 220 to be selectively moved back and forth along the rail 222B, by selectively tightening and loosening the fasteners 272.

Figure 8:
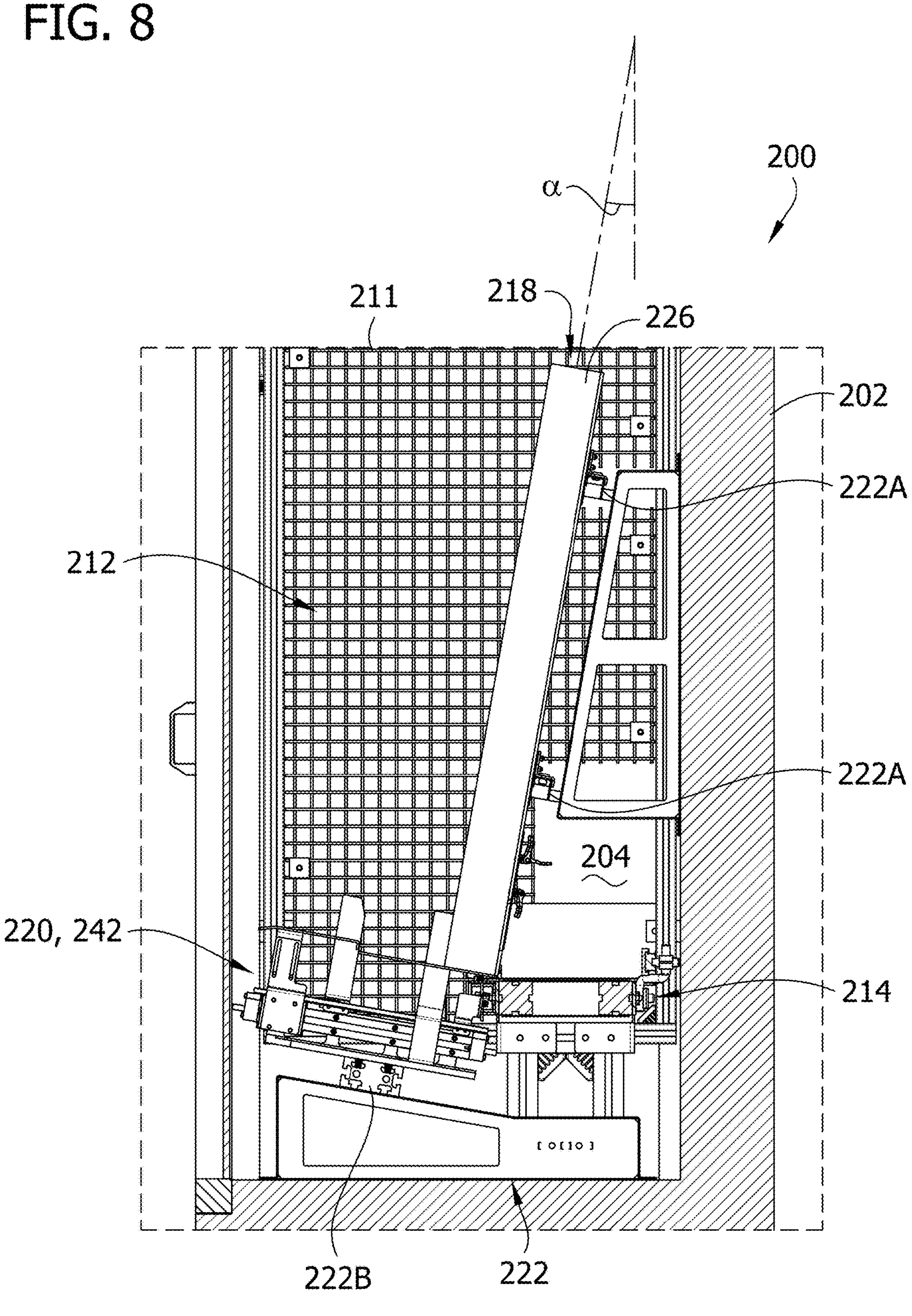
FIG. 8 is an enlarged, fragmentary section of the pharmaceutical container repository, with a container pusher in a starting position.
Figure 9:
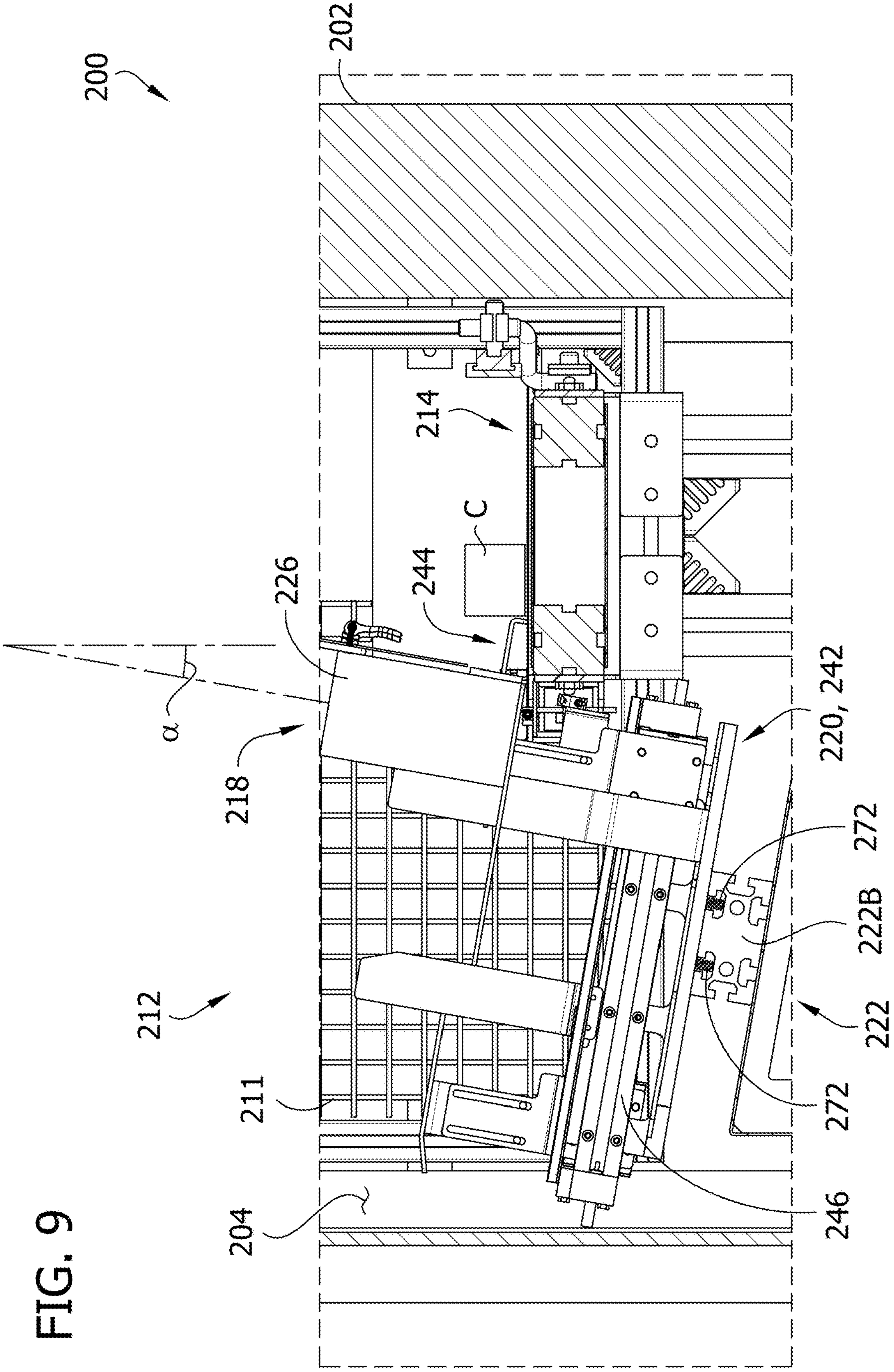
FIG. 9 is an enlarged, fragmentary section of the pharmaceutical container repository, with the container pusher in a pushed position.
Figure 10:
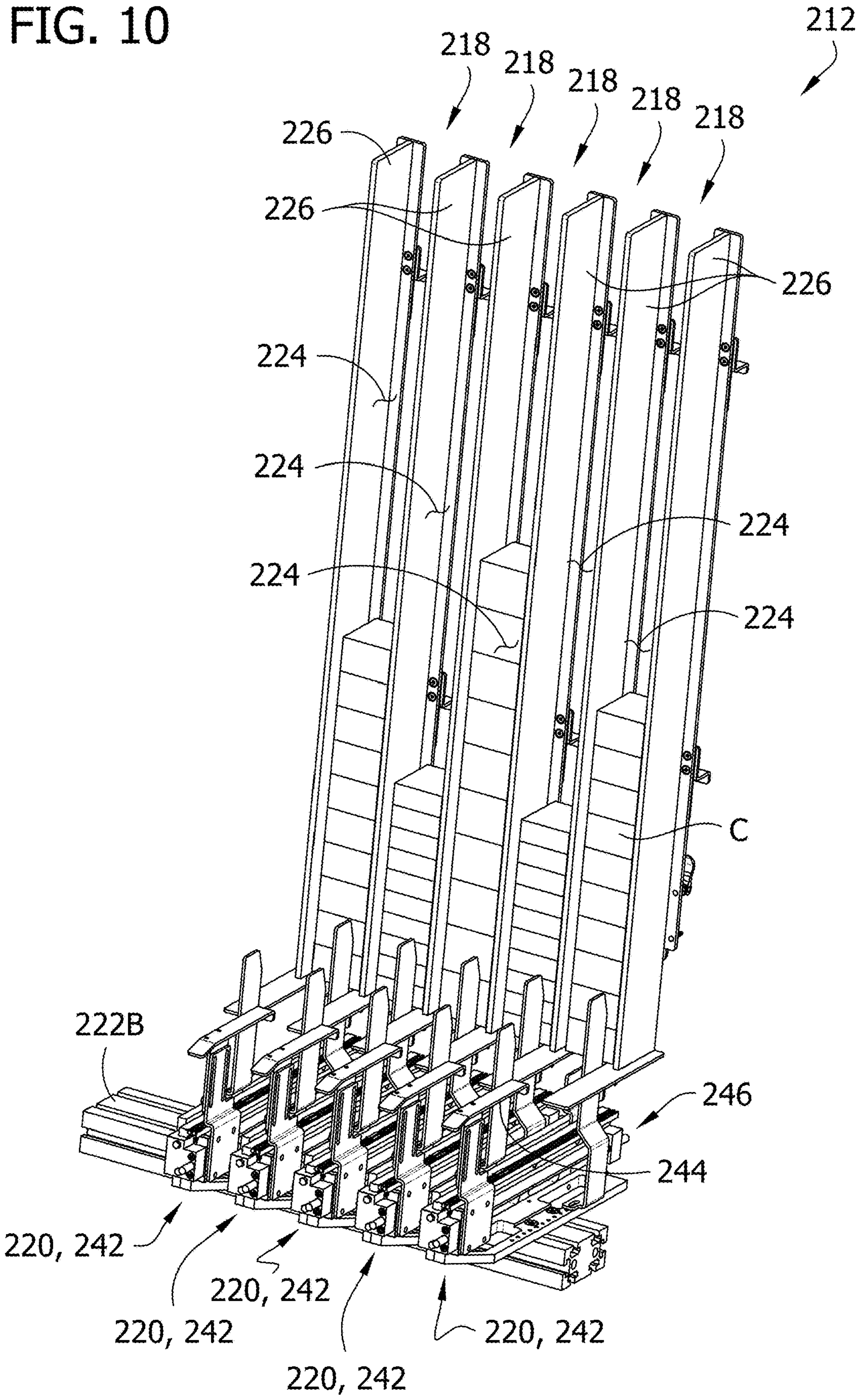
FIG. 10 is a perspective of a container holder of the pharmaceutical container repository.

Referring to FIGS. 8 and 9, the container receiver 218 is arranged to hold the stack of pharmaceutical containers C at a non-zero angle α relative to the vertical (e.g., a vertical axis). Thus, as illustrated, in frame 222 supports the container holder 212 in a titled configuration. The tilt results in the pharmaceutical containers C being biased against the rear wall of the container receiver 218 due to gravity. This helps ensure the pharmaceutical containers C remain in the container interior 224 when the pharmaceutical containers drop down in the container receiver after the bottom-most pharmaceutical container has been removed. This also allows the front of the container interior 224 to remain unobstructed, allowing for easier and quicker refilling of the container interior with packages. If the container receiver was arranged to hold the stack of pharmaceutical containers vertically, some containers may fall out of the container interior when dropping down and/or some sort of barrier (which would slow down reloading time) would be required to extend over the front of the container interior to keep the containers in the container receiver. Preferably, the non-zero angle α is within the inclusive range of about 10 degrees to about 15 degrees (±5 degrees). The non-zero angle α is large enough to ensure the pharmaceutical containers C will not fall out of the container receiver 218 when dropping down but shallow enough to minimize the ride up effect of the bottom-most pharmaceutical container C—e.g., the act of the bottom-most pharmaceutical container rising up as it rides across the conveyor 214 when being pushed. This could cause a pharmaceutical container to bind against the bottom of the push stops 266, especially for containers of longer lengths (and shorter heights), as the container is pushed, potentially damaging the container or preventing the container from being dispensed. It has been found that a non-zero angle α is within the inclusive range of about 10 degrees to about 15 degrees best balances these factors.

Referring to FIGS. 11 and 16, the container holder 212 may include a container sensor 273 associated with each container receiver 218. Each container sensor 273 is arranged to detect the presence or absence of a pharmaceutical container C at the bottom of the container interior 224 (e.g., bottom of the stack). The container sensors 273 can be any suitable sensors for detecting the presence and absence of a pharmaceutical container C such as a photoelectric sensor or ultrasonic sensor. Each container sensor 273 can be used to signal or detect when the container receiver 218 is empty of pharmaceutical containers C. For example, an alert can be activated and/or sent to an operator (by the control system 400 described below) when a container sensor 273 determines its corresponding container receiver 218 is empty so that the operator knows to refill the container receiver with additional pharmaceutical containers.

In one embodiment, the container repository 200 may include one or more temperature sensors 275 (FIG. 20) arranged in the interior 204 of the cabinet 202 for monitoring the temperature of the interior. The one or more temperature sensors 275 can be spread out around the interior 204 of the cabinet 202. In one embodiment, the refrigeration system 206 can be selectively turned on and off based on the temperature sensed by the temperature sensors 275. For example, the refrigeration system 206 can be turned on to cool the interior 204 of the cabinet 202 if the temperature in the interior exceeds a max threshold temperature, and operate until the interior is cooled to a desired set point temperature (e.g., 40° F.). In one embodiment, the container repository 200 includes an electronically operated lock 277 (FIG. 20) for each door 210. The container repository 200 (e.g., the control system 400 thereof described below) can monitory the temperature of the interior 204 of the cabinet 202 using the temperature sensors 275 and close the locks 277 to prevent the doors 210 from being opened if the temperature in the interior exceeds the max threshold temperature. This way, the doors 210 remain closed (to prevent heat exchange between the interior 204 and ambient environment) while the refrigeration system 206 is operating to cool down the interior 204 of the cabinet 202 back to the set point temperature. The locks 277 can be opened once the set point temperature is reached, thereby allowing an operator to open the doors 210 when needed to refill the container holders 212.

Figure 17A:
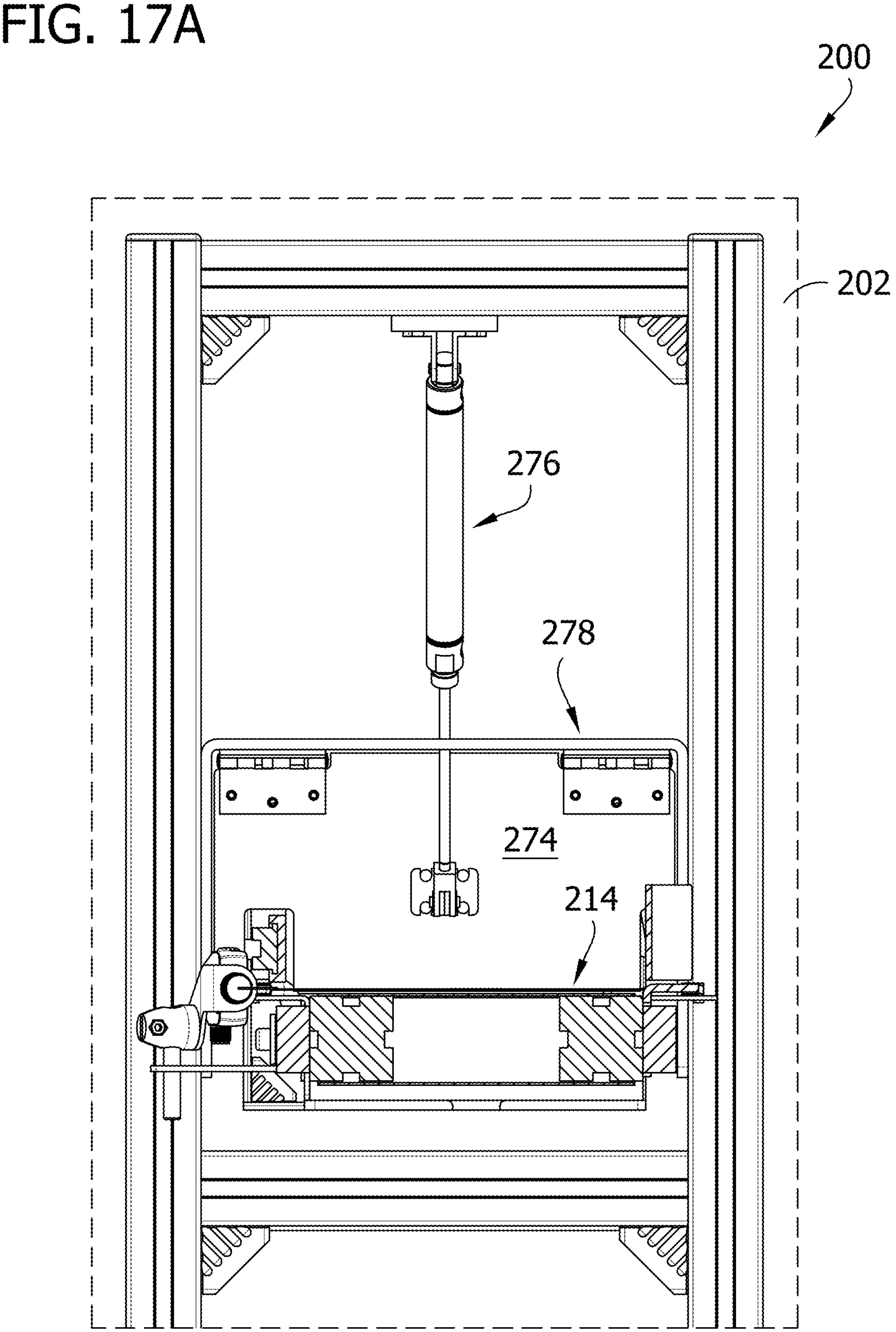
FIG. 17A is an enlarged, fragmentary section of the pharmaceutical container repository taken through line 17-17 in FIG. 5, with an exit door shown in a closed position.
Figure 17B:
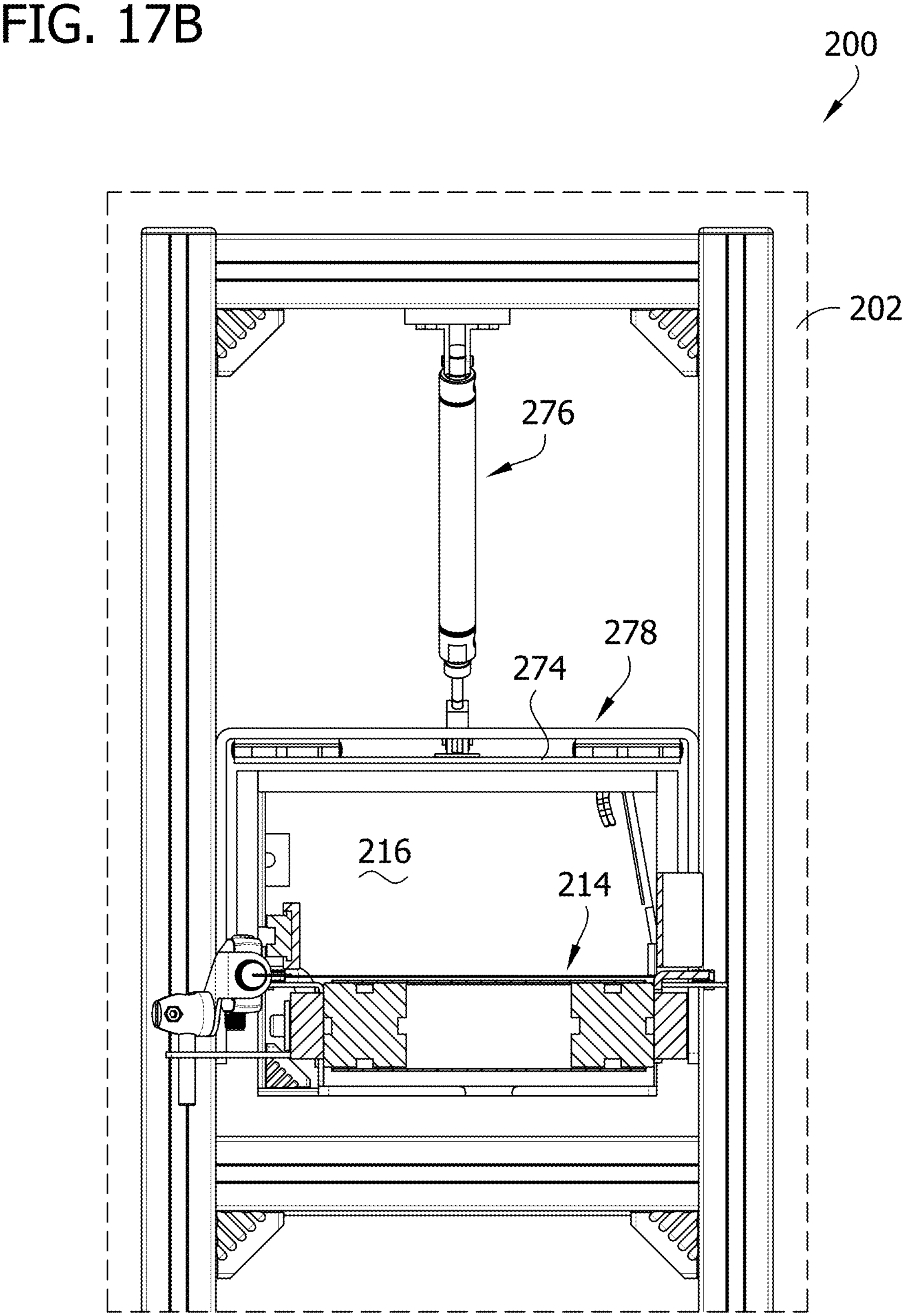
FIG. 17B is the same as FIG. 17A, except the exit door is shown in an open position.

Referring to FIGS. 4-7 and 17A-19, the container transporter 214 receives the pharmaceutical containers C from the container holder(s) 212 and transports the pharmaceutical containers out of the cabinet 202 by moving the pharmaceutical containers through the opening 216 in the side wall (FIG. 17B). The cabinet 202 may include a dispensing door 274 moveable between open and closed positions. In the open position (FIG. 17B), the opening 216 is open and pharmaceutical containers C can move there through. In the closed position (FIG. 17A), the door 274 blocks the opening 216. A door prime mover 276 is operatively connected to the door 274 to move (e.g., pivot) the door between the open and closed positions. The door prime mover 276 may be a pneumatic linear actuator or any other suitable device. In the illustrated embodiment, the door 274 pivots upward, about a hinge (broadly, pivot connection) from the closed position to the open position. Other configurations of the door may be used without departing from the scope of the present disclosure.

The container transporter 214 extends out from the cabinet 202, through the opening 216 in the side wall. The container repository 200 may include a tunnel 278 covering the portion of the container transporter 214 (e.g., conveyor) extending out of the cabinet 202. The tunnel 278 encloses the area above this portion of the container transporter. The tunnel 278 extends from the side wall of the cabinet. In one embodiment, the tunnel 278 has a length of at least 1 foot. Unexpectedly and surprisingly, it has been found that having the tunnel 278 reduces the amount of heat exchange between the interior 204 of the cabinet 202 and the environment surrounding the cabinet through the opening 216 (when the door 274 is in the open position). This is particularly important when the interior 204 of the cabinet 202 is refrigerated. Accordingly, the tunnel 278 prevents the temperature of the interior 204 of the cabinet 202 from significantly raising (e.g., warming to a temperature that is not safe to store the pharmaceutical containers in) when the door 274 is in the open position. It has been found that the addition of the tunnel 278 allows the door 274 to remain in the open position for an extended period of time (e.g., 5 minutes) with the temperature of the interior 204 of the cabinet 202 remaining at safe levels without having to run the refrigeration system 206 excessively to compensate for the heat loss (or require a refrigeration system with a larger cooling capacity to compensate for the heat loss). The refrigeration system 206 is able to run normally as if the door 274 was in the closed position. Alternatively or additionally, other ways of reducing heat exchange through the opening 216 can used, such a blower that creates an air curtain across the opening and/or a flexible curtain (e.g., strip curtain). In an example, the door 274 is in the open position during a run of dispensing multiple pharmaceutical containers C from the interior 204 of the cabinet 202. In an example embodiment, the door 274 will only be in the open position for the time required for the pharmaceutical container C to move through the opening 216 and clear the door, no more than about 15-20 seconds. In the illustrated embodiment, the tunnel 278 comprises opposite vertical side walls and a horizontal top wall extending between the side walls. Other configurations of the tunnel may be used without departing from the scope of the present disclosure.

In one embodiment, the container repository 200 includes a first or opening container sensor 280 upstream of the opening 216 and a second or closing container sensor 282 downstream of the opening. The container sensors 280, 282 detect the presence or absence of the pharmaceutical container C as the container is moved along by the container transporter 214. The container sensors 280 can be any suitable sensors for detecting the presence and absence of a pharmaceutical container C such as a photoelectric sensor or ultrasonic sensor. The container sensors 280, 282 can be used to signal when the door 274 should be moved between the opening and closed positions. For example, the door 274 can move to the open position in response to the first container sensor 280 detecting a pharmaceutical container C and be moved back to the closed position in response to the second container sensor 282 detecting the pharmaceutical container C (or in response to the second container no longer detecting the presence of the pharmaceutical container).

Figure 18:
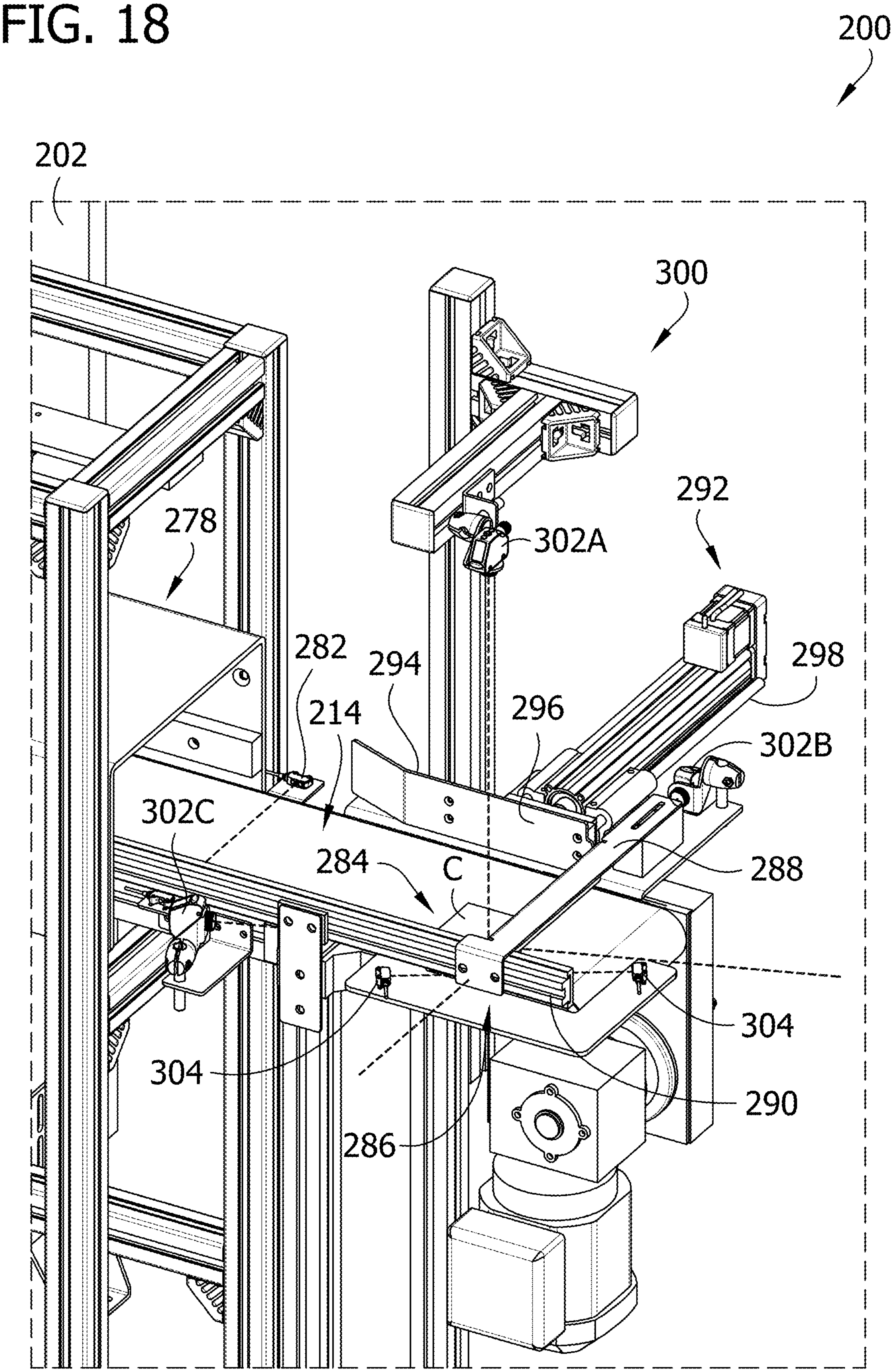
FIG. 18 is an enlarged, fragmentary perspective of a pickup station of the pharmaceutical container repository.
Figure 19:
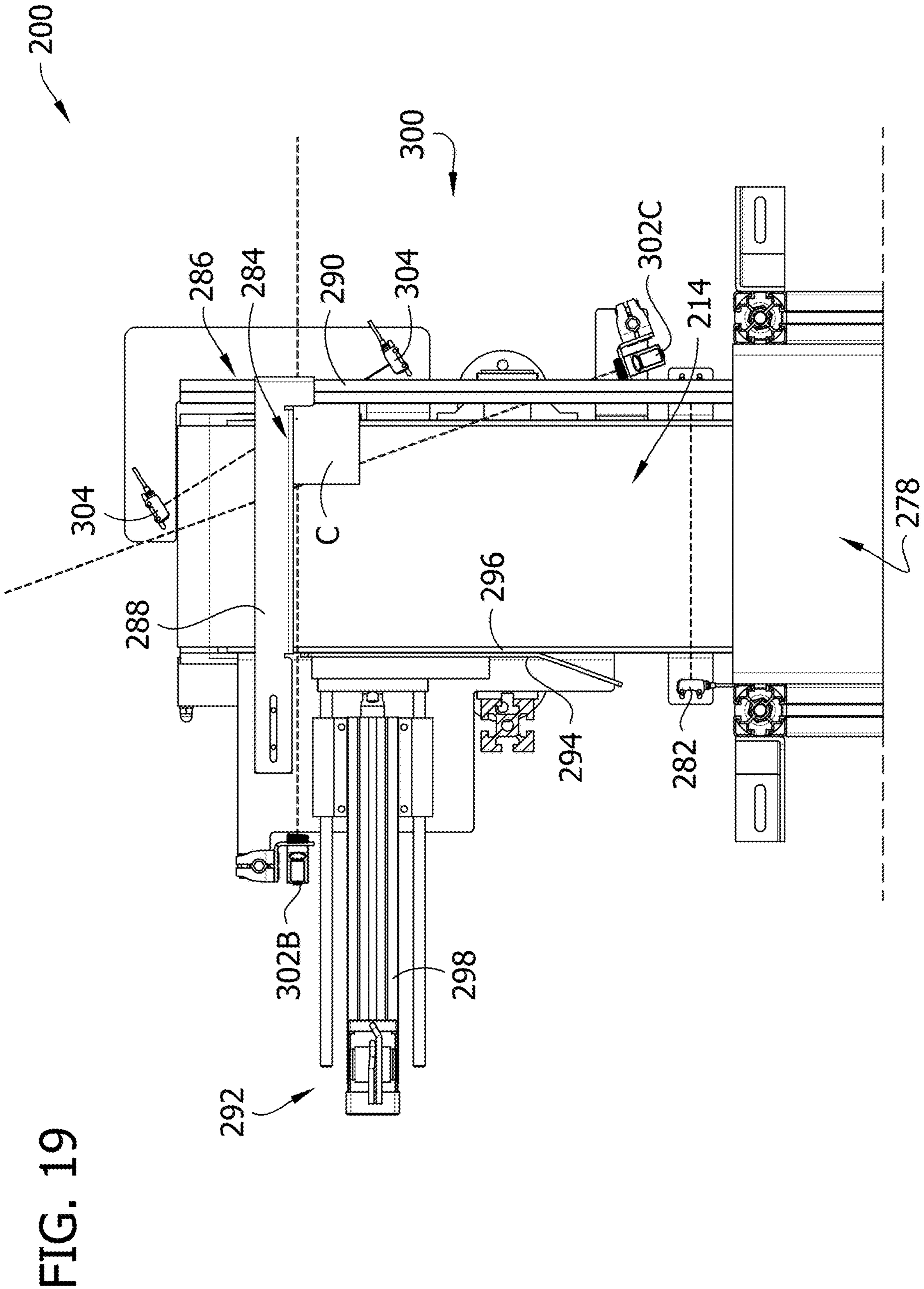
FIG. 19 is an enlarged, fragmentary plan view of the pickup station.

The container transporter 214 (e.g., conveyor) is configured to transport the pharmaceutical containers C to a set or pickup location 284 (FIG. 19). The container transporter 102 is configured to remove the pharmaceutical container C from the pickup location. Having a pickup location prevents the container transporter 102 (or some other device) from having to determine the location of the pharmaceutical container C about to be picked up. Instead, the container transporter 102 can always return to the same location to pickup the pharmaceutical containers C. The container repository 200 includes a container locator 286 defining the pickup location. The container locator 286 forms a corner or pocket. When the pharmaceutical container C (e.g., a corner thereof) is in the corner of the container locator 286, then the pharmaceutical container is in the pickup location 284. In the illustrated embodiment, the container locator 286 includes a cross-rail 288 and a side rail 290. The cross-rail 288 extends across the conveyor belt and prevents the pharmaceutical container C from continuing to move with the conveyor belt. The side rail 290 extends along one side of the conveyor belt. The cross-rail 288 is oriented generally perpendicularly to the side rail 290. Together the cross-rail 288 and the side rail 290 form the corner of the container locator 286. The container transporter 214 supports the pharmaceutical containers C in the pickup location. Specifically, the pharmaceutical containers C rest on the conveyor belt in the pickup location (the conveyor belt may slide under the containers in the pickup location). It is appreciated that the arrangement of the container holder(s) 212 and the manner in which the pharmaceutical containers C are moved to the container transporter 214 results in the pharmaceutical containers being in a position suitable for nesting with the corner of the container locator 286 (e.g., the length and width of the pharmaceutical container are generally parallel to the width and length, respectively, of the conveyor belt). However, the pharmaceutical containers C may generally be at any position, widthwise, on the conveyor belt when dispensed to the conveyor by the container dispenser 220. Accordingly, the container repository 200 may include a container positioner 292 configured to position the pharmaceutical containers C in the pickup location 284. In the illustrated embodiment, the container positioner 292 is a pusher arranged to push the pharmaceutical containers C against the side rail 290. Thus, the combined operation of the conveyor moving the pharmaceutical containers C toward and against the cross-rail 288 and the container positioner 292 moving the pharmaceutical containers toward and against the side rail 290 moves the pharmaceutical containers into the corner of the container locator 286, and therefore into the pickup location 284. The container positioner 292 will generally move (e.g., engage) pharmaceutical containers C one at a time. In the illustrated embodiment, the container positioner 292 includes a push plate 294 defining a push surface 296 for pushing the pharmaceutical containers C against the side rail 290. The push plate 294 is operatively connected to a prime mover 298 (e.g., positioner prime mover) of the container positioner 292. In the illustrated embodiment, the prime mover 298 is a pneumatic linear actuator, although other types of prime movers (e.g., electric linear actuator, electric motor, etc.) may be used without departing from the scope of the present disclosure. In operation, the positioner prime mover 298 extends the push plate 294 from a home position (FIGS. 18 and 19) toward the side rail 290 to push the pharmaceutical container C against the side rail and then retracts the push plate 294 back to the home position. This may occur before or after the pharmaceutical container C contacts the cross-rail 288.

Still referring to FIGS. 18 and 19, the container repository 200 can includes a sensor array 300 configured to determine or detect the height, width, and/or length (broadly, a dimension or dimensions) of the pharmaceutical containers C when the pharmaceutical containers are in the pickup location 284. The sensor array 300 includes at least one container sensor 302 (e.g., container dimension sensor) arranged to detect the height, width, or length of the pharmaceutical containers C when the pharmaceutical containers are in the pickup location 284. The sensor array 300 includes a height container sensor 302A arranged to detect the height of the pharmaceutical container C in the pickup location 284. The height container sensor 302A overlies the pickup location 284 and faces downward toward the pickup location. The sensor array 300 includes a length container sensor 302B arranged to detect the length of the pharmaceutical container C in the pickup location 284. Due to the orientation the container holders 212 dispense the pharmaceutical containers C onto the container transporter 214, the length of the pharmaceutical containers C is oriented generally perpendicularly to the travel direction of the container transporter (likewise the width of the pharmaceutical container is oriented generally parallel to the travel direction). The length container sensor 302B is disposed just upstream of the cross-rail 288. The sensor array 300 includes a width container sensor 302C arranged to detect the width of the pharmaceutical container C in the pickup location 284. The width container sensor 302C is offset (e.g., laterally or horizontally offset) from the container transporter 214 and is oriented at (e.g., a sensor beam thereof is oriented at) an a known or set angle to the travel direction of the container transporter (e.g., oriented at an angle to the width of the pharmaceutical container). This configuration allows the pharmaceutical container C to move toward the pickup location 284 without being blocked by the width container sensor 302C. Using basic trigonometry using the known angle of orientation of the width container sensor 302C and the distance measured by the width container sensor, the width of the pharmaceutical container C can be determined. The length container sensor 302B is disposed just upstream of the pickup location 284 and is arranged to face the pickup location (through a gap or opening in the side rail 290). In one embodiment, the container sensors 302 are laser sensors suitable for measuring a distance, although other types of sensors may be used without departing from the scope of the present disclosure.

Using the sensor array 300 (e.g., container dimension sensors 302) to find the dimensions (e.g., height, length, width) of the pharmaceutical container C in the pickup location 284 can be used to confirm the correct pharmaceutical container has been dispensed by the container repository 200. For example, the dimensions of the pharmaceutical container C determined by the sensor array 300 can be compared to baseline dimensions of the pharmaceutical container C (stored in a database). If the dimensions match or are within an acceptable variation (e.g., ±5%) of the baseline dimensions, then the container repository has confirmed the correct pharmaceutical container C has been dispensed. Further, based on the determined dimensions, the container transporter 102 can be operated to effectively remove the pharmaceutical container from the pickup location 284. For example, it can be determined where the container transporter 102 (e.g., a suction gripper thereof) should pick up the pharmaceutical container (e.g., a center thereof) based on the determined dimensions.

The sensor array 300 may also include a container position sensor 304 arranged to detect whether or not the pharmaceutical container C is in the pickup location 284. In the illustrated embodiment, the container position sensor 304 comprises beam-break sensors arranged such that a beam (e.g., light beam) extends through the pickup location 284 at the corner formed by the container locator 286 (e.g., as close to the corner as possible). When the corner of the pharmaceutical container C is nested with the corner of the container locator 286, the corner of the pharmaceutical container breaks or interrupts the beam, thereby indicating that the pharmaceutical container is in the pickup location. The beam may extend through gaps or openings in the cross-rail 288 and/or side rail 290. Other types of sensors may be used without departing from the scope of the present disclosure.

Figure 20:
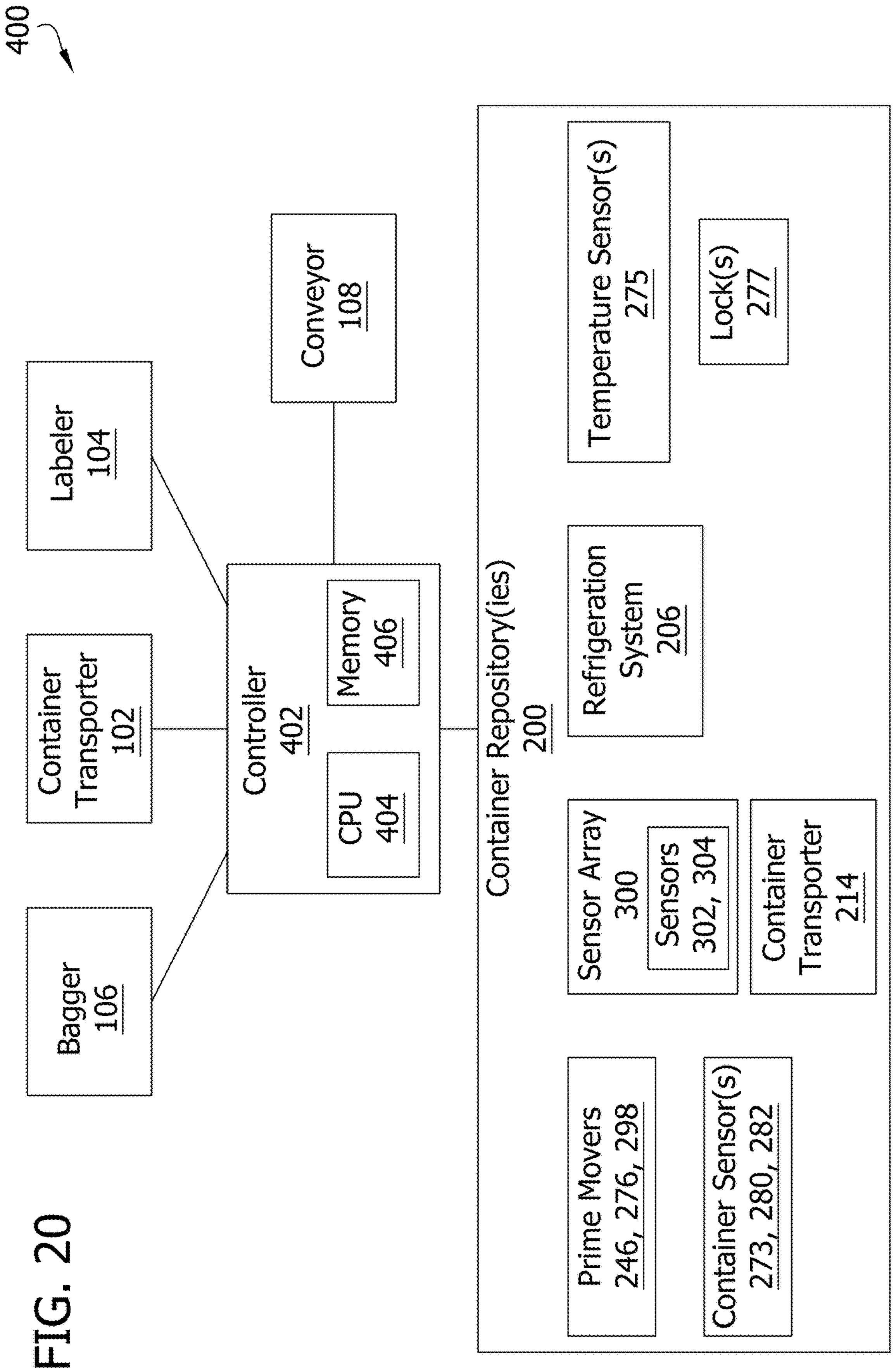
FIG. 20 is a schematic diagram of an example control system for the pharmaceutical container processing system.

Referring to FIG. 20, an example control system (e.g. pharmaceutical container processing system control system) of the pharmaceutical container processing system 100 is generally indicated by reference numeral 400. The control system 400 includes a controller 402 (broadly, a computer) for controlling and operating the pharmaceutical container processing system 100 and its components. The controller 402 includes a CPU or processor 404 (e.g., a pharmaceutical container processing system processor) and RAM or memory 406 (broadly, non-transitory computer readable storage medium). The controller 402 directs (e.g., controls and operates) the various components (e.g., the container repositories 200, the container transporter 102, the labeler 104, the packaging device 106, and the conveyor 108) and sub-components (e.g., prime movers 246, 276, 298, etc.) thereof. Broadly, the memory 406 includes (e.g., stores) processor-executable instructions for controlling the operation of the pharmaceutical container processing system 100 and the components thereof. The instructions embody one or more functional aspects of the pharmaceutical container processing system 100 and components thereof (as described herein), with the processor 402 executing the instructions to perform said one or more functional aspects. The components of the pharmaceutical container processing system 100 may be in wired or wireless communication with the controller 402. The controller 402 may be a dedicated controller for the pharmaceutical container processing system 100 (as illustrated) that is in communication with a control system of the pharmacy 12, part of the control system of the pharmacy, or a dedicated controller for just the container repository 200 that is in communication with a control system of the pharmaceutical container processing system 100. Other configurations of the control system 400 may be used without departing from the scope of the present disclosure.

The controller 402 is communicatively coupled to the various components of the pharmaceutical container processing system 100 to control and/or operate these components. The controller 402 is configured to receive a prescription order for a patient and to direct (e.g., operate), as described herein, the pharmaceutical container processing system 100 to fulfill the prescription order (e.g., prepare a package for shipping containing the one or more pharmaceutical containers C that the prescription order calls for). For example, the controller 402 can operate the appropriate prime mover 246 of the container holder(s) 212 to dispense the appropriate pharmaceutical container C (based on the received prescription order) onto the container transporter 214. The controller 402 can then operate the container transporter 214 to move the dispensed pharmaceutical container C toward the pickup location 284. The controller 402 can operate the door prime mover 276 to open and close the door 274 to permit the dispensed pharmaceutical container C to be carried toward the pickup location 284. The controller 402 can also operate the positioner prime mover 298 to move the dispensed pharmaceutical container C into the pickup location 284. The controller 402 can then operate the container transporter 102 to remove the dispensed pharmaceutical container C from the pickup location 284. The controller 402 may also provide information (e.g., patient name, prescription information, etc.) to the labeler 104 for the creation of the label for the pharmaceutical container C. Other types of information can also be shared between the controller 402 and the components of the pharmaceutical container processing system 100. Accordingly, it is understood the controller 402 directs the components of the pharmaceutical container processing system 100 as necessary to perform the functions described herein.

In an example, the present system can be used to dispense controlled substances in the containers C. The cabinet or housing 202 of container repository 200 can include a refill door 210 that are secured by a lock, which may be electronically operable by the controller 402 or a mechanically by key. When the refill doors are locked, access by a person to the containers C within the housing 202 is prevented. Even while the refill doors are locked, the system can operate to dispense the containers C through the dispensing door 274. The dispensing door 274 is normally closed to prevent access to the interior of the housing 202. The dispensing door 274 is positioned such that a person cannot reach through the dispensing door 274 and reach into the container holder 212. The access portion of the container holder 212 is opposite container transporter 214 and the remote from the dispensing door 274. The container holder 212 and positioning of the dispensing door 274 assist in preventing access to the containers C.

Although described in connection with an example computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the example operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

It is apparent that the elements, features, and/or teachings set forth in each embodiment disclosed herein are not limited to the specific embodiment(s) the elements, features and/or teachings are described in. Accordingly, it is understood that the elements, features and/or teachings described in one embodiment may be applied to one or more of the other embodiments disclosed herein, even if said elements, features and/or teachings where not described herein as being a part of said one or more of the other embodiments.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles “a,” “an,” “the,” and “said” are intended to mean that there are one or more of the elements. The terms “comprising,” “including,” and “having” are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A container repository for containers, the container repository comprising:
- a cabinet having an interior;
- a conveyor disposed in the interior of the cabinet and extending out of the cabinet, the conveyor configured to transport the containers toward a set location outside of the cabinet, the conveyor being arranged to support the containers in the set location;
- a container holder disposed in the interior of the cabinet, the container holder configured to dispense the containers toward the conveyor;
- a container positioner configured to position the containers in the set location; and
- a container locator defining the set location and being configured to retain the containers in the set location.

2. The container repository of claim 1, wherein the conveyor comprises an endless conveyor belt.

3. The container repository of claim 1, wherein the container positioner is configured to move the containers relative to the conveyor to position the containers in the set location.

4. The container repository of claim 3, wherein the container positioner is configured to move the containers crosswise relative to a direction of travel of the conveyor to position the containers in the set location.

5. The container repository of claim 1, wherein the container positioner includes a surface configured to engage the containers to position the containers in the set location.

6. The container repository of claim 5, wherein the container positioner includes a prime mover configured to move the surface relative to the conveyor to position the containers in the set location.

7. The container repository of claim 6, wherein the prime mover comprises a linear actuator.

8. The container repository of claim 1, wherein the container locator includes a cross-rail extending across the conveyor and configured to block the containers from moving with the conveyor in a direction of travel of the conveyor.

9. The container repository of claim 8, wherein the container locator includes a side rail extending along a side of the conveyor, the cross-rail and the side rail forming a pocket at the set location configured to receive the containers.

10. The container repository of claim 1, further comprising a container position sensor arranged to detect whether or not the containers are in the set location.

11. The container repository of claim 1, further comprising a first container sensor arranged to determine a height, a width, or a length of the containers when the containers are in the set location.

12. The container repository of claim 11, further comprising a second container sensor arranged to determine a different one, from the first container sensor, of the height, the width, or the length of the containers when the containers are in the set location.

13. The container repository of claim 12, further comprising a third container sensor arranged to determine a different one, from the first and second container sensors, of the height, the width, or the length of the containers when the containers are in the set location.

14. The container repository of claim 1, further comprising a door and a prime mover operatively coupled to the door to move the door between an open position to permit containers to exit the interior of the cabinet as the containers are transported toward the set location by the conveyor and a closed position.

15. The container repository of claim 14, further comprising a container sensor upstream of the door along the conveyor, the container sensor being configured to detect the presence of the containers being transported by the conveyor, the prime mover configured to move the door toward the open position in response to the container sensor detecting the presence of the containers.

16. The container repository of claim 1, further comprising a tunnel covering the portion of the conveyor extending out of the cabinet.

17. The container repository of claim 1, further comprising a refrigeration system configured to refrigerate the interior of the cabinet.

18. The container repository of claim 1, further comprising a robotic arm configured to remove the containers from the set location.

* * * * *